United States Patent
Bartel et al.

(10) Patent No.: US 11,701,845 B2
(45) Date of Patent: Jul. 18, 2023

(54) METHOD FOR FORMING A COMPOSITE SOLE STRUCTURE COMPONENT

(71) Applicant: NIKE, Inc., Beaverton, OR (US)

(72) Inventors: Aaron Bartel, Beaverton, OR (US); Ryan Hood, Beaverton, OR (US); Sam Lacey, Portland, OR (US); Christian Alexander Steinbeck, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 268 days.

(21) Appl. No.: 17/022,891

(22) Filed: Sep. 16, 2020

(65) Prior Publication Data

US 2021/0078267 A1    Mar. 18, 2021

Related U.S. Application Data

(60) Provisional application No. 62/901,330, filed on Sep. 17, 2019.

(51) Int. Cl.
*B29C 70/84* (2006.01)
*B29C 35/02* (2006.01)
(Continued)

(52) U.S. Cl.
CPC .............. *B29C 70/84* (2013.01); *A43B 13/04* (2013.01); *B29C 35/02* (2013.01); *B29C 45/14* (2013.01);
(Continued)

(58) Field of Classification Search
CPC .............. B29C 70/84; B29C 45/14065; B29C 45/1418
See application file for complete search history.

(56) References Cited

U.S. PATENT DOCUMENTS

| | | | |
|---|---|---|---|
| 2,604,362 A | * | 7/1952 | Sugerman ................ A46B 3/00 15/DIG. 3 |
| 2,666,954 A | * | 1/1954 | Potter ..................... B29C 44/56 401/196 |

(Continued)

FOREIGN PATENT DOCUMENTS

CN          107006949 A        8/2017

OTHER PUBLICATIONS

International Preliminary Examining Authority, Written Opinion for PCT for application No. PCT/US2020/051155 dated Aug. 18, 2021.
(Continued)

*Primary Examiner* — Edmund H Lee
(74) *Attorney, Agent, or Firm* — Honigman LLP; Matthew H. Szalach; Jonathan P. O'Brien

(57) ABSTRACT

A method of forming a composite article includes constructing a preform having a strand layer including an interior portion and a peripheral portion surrounding the interior portion. The strand layer includes a plurality of strand segments traversing the interior portion and defining a first strand segment population density and a second strand segment population density. The preform is inserted into the mold cavity so that the interior portion of the preform is received in a molding region of the mold cavity. The molding region has a first thickness corresponding to the first strand segment population density and a second thickness corresponding to the second strand segment population density. Following the inserting, the mold is closed and the interior portion of the preform is compressed within the molding region. In the closed mold, the peripheral portion of the strand layer may be maintained in a loose state within the relief region.

14 Claims, 17 Drawing Sheets

(51) Int. Cl.
  *B29D 35/12* (2010.01)
  *A43B 13/04* (2006.01)
  *B29C 45/14* (2006.01)
  *B29K 101/12* (2006.01)

(52) U.S. Cl.
  CPC ........ *B29C 45/1418* (2013.01); *B29D 35/122* (2013.01); *B29D 35/128* (2013.01); *B29K 2101/12* (2013.01)

(56) References Cited

U.S. PATENT DOCUMENTS

| | | | | |
|---|---|---|---|---|
| 2,950,495 | A | * | 8/1960 | Stingley ................ A47L 11/164 15/DIG. 3 |
| 3,142,081 | A | * | 7/1964 | Hartz .................. A46B 13/001 15/DIG. 3 |
| 3,372,220 | A | * | 3/1968 | Stingley ............ B29C 45/14385 15/DIG. 3 |
| 3,673,611 | A | * | 7/1972 | Cain ...................... A41C 5/005 2/200.1 |
| 4,092,758 | A | * | 6/1978 | Horton ..................... A46B 3/04 15/DIG. 3 |
| 5,108,155 | A | * | 4/1992 | Hettes ...................... A46B 3/04 264/243 |
| 5,378,051 | A | * | 1/1995 | Kirkkala .................. A46B 7/10 15/183 |
| 2016/0001478 | A1 | | 1/2016 | Cook et al. |
| 2019/0223546 | A1 | | 7/2019 | Bartel et al. |
| 2019/0239596 | A1 | | 8/2019 | Ploem |

OTHER PUBLICATIONS

European Patent Office (ISA), International Search Report and Written Opinion for PCT Application No. PCT/US2020/051155 dated Jan. 13, 2021.

* cited by examiner

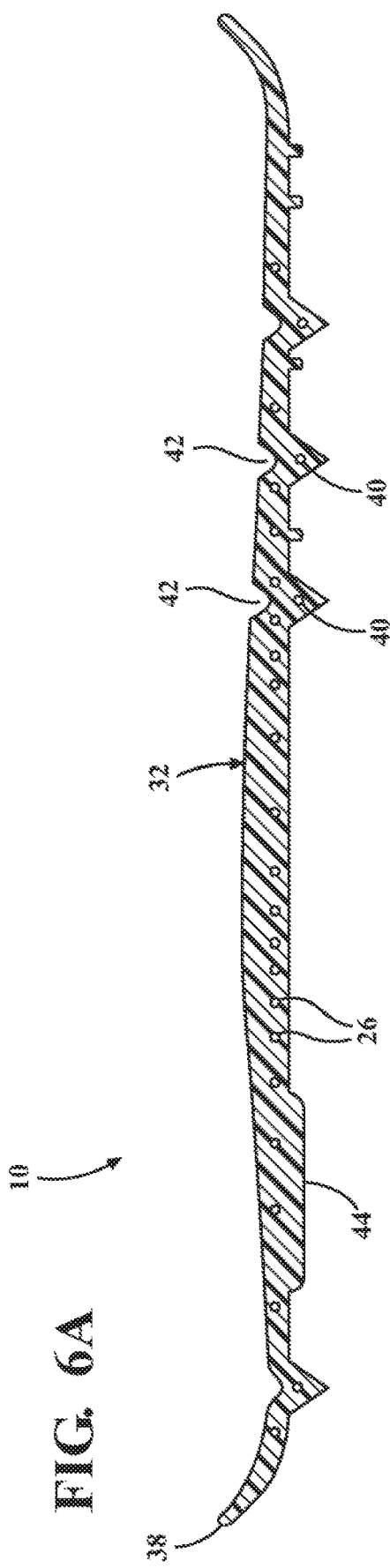
FIG. 6A
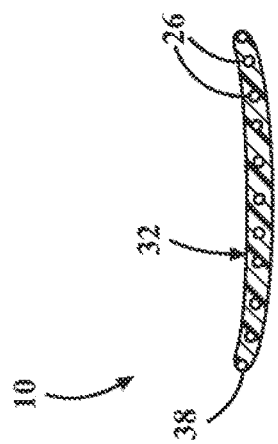
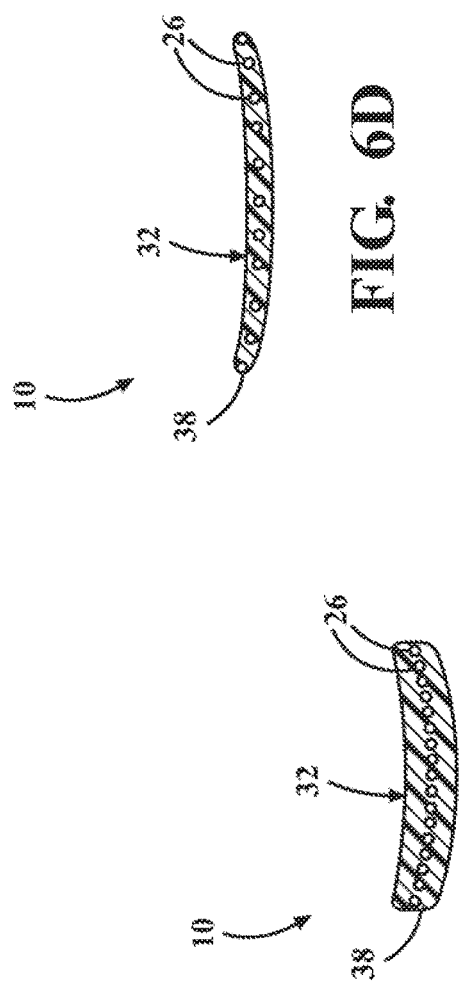
FIG. 6C
FIG. 6D
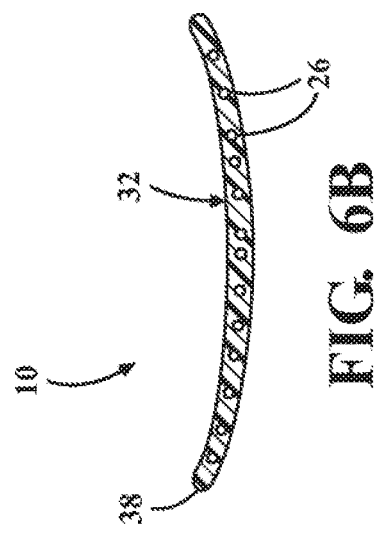
FIG. 6B

METHOD FOR FORMING A COMPOSITE SOLE STRUCTURE COMPONENT

CROSS REFERENCE TO RELATED APPLICATIONS

This patent application claims priority under 35 U.S.C. § 119(e) to U.S. Provisional Application 62/901,330, filed on Sep. 17, 2019. The disclosure of this prior application is considered part of the disclosure of this application and is hereby incorporated by reference in its entirety.

FIELD

The present disclosure relates generally to a system and method for forming a molded composite article, such as a molded composite sole structure component.

BACKGROUND

This section provides background information related to the present disclosure which is not necessarily prior art.

Articles of footwear conventionally include an upper and a sole structure. Such sole structures typically include a layered arrangement extending between a ground surface and the upper. The layered arrangement may include a midsole that provides the sole structure with a degree of cushioning and an outsole that provides the sole structure with abrasion-resistance and traction with the ground surface. The midsole and/or outsole may additionally include a plate formed of a rigid or semi-rigid material that provides rigidity and energy distribution across the sole structure.

In some instances, the plate is formed of a composite material including one or more strands of fibers (including loose strands of fibers, bunched strands of fibers or tows, fibers present in the form of a textile, and strands affixed to a textile) surrounded and consolidated by a solid polymeric material. During manufacturing of the plate, strands may be inserted into a mold cavity and combined with a solid polymeric material (e.g., by injecting a liquid material into the mold cavity or by melting a thermoplastic material present in the mold cavity) to surround, consolidate, and bond the strands together, thereby forming a rigid or semi-rigid plate. In some instances, the strands inserted into the mold cavity are of a larger dimension than the finished composite article. Thus, after the molding process, the excess strands and solid polymeric material must be trimmed to form the peripheral profile of the finished composite article.

DRAWINGS

The drawings described herein are for illustrative purposes only of selected configurations and are not intended to limit the scope of the present disclosure.

FIG. 6A is a cross-sectional view of the finished composite plate of FIG. 5C, taken along Line 6A-6A in FIG. 5C;

FIG. 6B is a cross-sectional view of the finished composite plate of FIG. 5C, taken along Line 6B-6B in FIG. 5C;

FIG. 6C is a cross-sectional view of the finished composite plate of FIG. 5C, taken along Line 6C-6C in FIG. 5C;

FIG. 6D is a cross-sectional view of the finished composite plate of FIG. 5C, taken along Line 6D-6D in FIG. 5C;

Corresponding reference numerals indicate corresponding parts throughout the drawings.

DETAILED DESCRIPTION

Figure 1A:
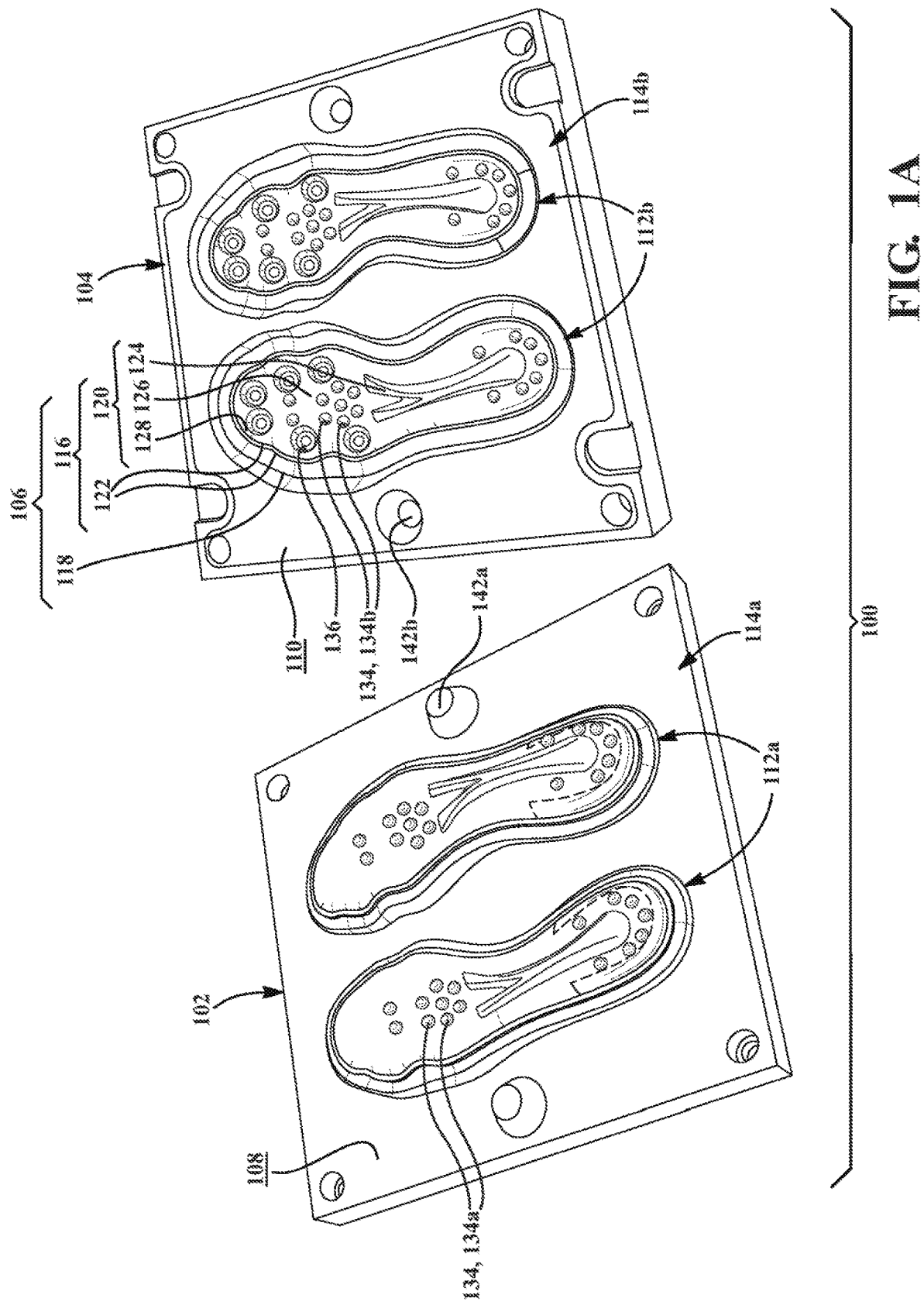
FIG. 1A is an exploded perspective view of a mold system according to the principles of the present disclosure.

The present disclosure is directed to methods of manufacturing composite articles, molds for use in the methods, composite articles made using the methods and/or the molds, and articles of footwear incorporating the composite articles. In some examples, composite articles made using the methods and/or molds are provided in an intermediate state, and include a trim flange. In other examples, the composite articles made using the methods and/or molds are provided in a finished state, where the trim flange has been removed. When molding composite articles, ensuring even pressure distribution across the entire article is desired to achieve optimum part quality. In some methods of making composite articles, preforms are initially formed by winding one or more tows or strands upon a substrate. The substrate can be rigid or flexible. As the strands are wound back and forth upon the substrate, it is necessary to turn or loop the strands at the edges of the substrate. Because tows of strands tend to be flat, there is a tendency of the tow to bunch or twist in these turns. Additionally, in some methods it is necessary to utilize additional stitching to secure the tows in these turns. As a result of either or both of these phenomena, a thickness of the article preform tends to be higher at the peripheral edges than in the center of the preform, both before and after the preform is consolidated with solid polymeric material. Traditionally, this variable thickness has been addressed by trimming off the peripheral edges. While trimming does result in a uniform thickness preform and/or composite article, there are several challenges involved with this approach. For example, when the peripheral edges are trimmed prior to consolidation, the strands tend to move and/or get pulled out of the preform, leading to an inferior part after consolidation. Additionally, trimming of unconsolidated preforms as well as consolidated articles can generate undesirable fiber dust, such as carbon fiber dust when using carbon fiber strands. The proposed tooling-based approach of the present disclosure eliminates these concerns.

In one example of the present disclosure, a mold is provided and includes a first mold plate and a second mold plate, which cooperate to define a mold cavity including an article forming region, a trim region surrounding the article forming region, and a relief region surrounding the trim region. In use, a preform including one or more strands, such as one or more strands stacked upon a substrate, is placed within the mold cavity so that a peripheral portion of the strand extends into the relief region. Additionally, a peripheral portion of the substrate can extend into the relief region, or can extend into the trim region. The strands stacked upon the substrate can be in the form of plies. Each of the plies may be formed by winding one or more strands upon the substrate such that the peripheral region of each ply includes loops or ends formed where each strand is turned or terminates. When placed within the mold cavity, the ends and the loops of the strands will be disposed within the relief region of the mold cavity. An interior void formed by the relief region can be sized such that the ends and the loops of the strands can loosely bunch within the relief region without forming pinch points or frustrating the arrangement of the strands within the molding region. The mold is then closed, and a liquid material is used to form a composite preform. As molded, the composite preform includes a trim flange associated with the trim region, and flashing associated with the relief region. Particularly, the trim region forms a trim flange surrounding the periphery of an article. The trim region allows excess material, including the loops and ends of the strands present in the relief region, to be easily removed to define a smooth outer perimeter of the composite article.

One aspect of the disclosure provides a mold for forming a composite article. The mold includes a first mold plate and a second mold plate. The first mold plate has a first mold surface defining a first portion of a mold cavity. The second mold plate has a second mold surface opposing the first mold surface of the first mold plate and defining a second portion of the mold cavity. The mold cavity includes (i) an article-forming region configured to impart a profile of the composite article, (ii) a trim region surrounding the article-forming region, and (iii) a relief region surrounding the trim region.

Another aspect of the disclosure provides a method for forming a composite article. The method includes inserting a preform into a mold cavity of a mold, wherein the preform has an interior portion and a peripheral portion surrounding the interior portion. Inserting the preform includes receiving the interior portion of the preform in a molding region of the mold cavity and receiving the peripheral portion of the preform in a relief region of the mold cavity. The method further includes closing the mold after the preform is inserted into the mold cavity. When the mold is closed, the interior portion of the preform is compressed within the molding region of the mold cavity. During compression, the peripheral portion of the preform is maintained in a loose state within the relief region.

In yet another aspect of the disclosure, a composite article is formed using the aforementioned mold and/or method. Particularly, the composite article is formed by inserting a preform into a mold cavity of a mold, wherein the preform has an interior portion and a peripheral portion surrounding the interior portion. Inserting the preform includes receiving the interior portion of the preform in a molding region of the mold cavity and receiving the peripheral portion of the preform in a relief region of the mold cavity. The method further includes closing the mold after the preform is inserted into the mold cavity. When the mold is closed, the interior portion of the preform is compressed within the molding region of the mold cavity. During compression, the peripheral portion of the preform is maintained in a loose state within the relief region.

Another aspect of the disclosure provides a composite preform. The composite preform includes one or more strands forming a plurality of strand segments traversing an interior portion of the composite preform, and one or more loops disposed in a peripheral portion of the preform and connecting the plurality of strand segments. A solid polymeric material is infused within and consolidates the strand layer. When the composite article is a composite component for a footbed for an article of footwear, the composite preform may include a footbed, a trim region surrounding an outer perimeter of the footbed, and a relief region surrounding an outer perimeter of the trim region.

Another aspect of the disclosure provides a composite article including one or more strands forming a plurality of strand segments, and a solid polymeric material infused within and consolidating the strand layer. The composite article may be formed with a continuous peripheral edge, where the plurality of the strand segments are trimmed along the continuous peripheral edge.

In one configuration, a method of forming a composite article is provided and includes inserting a preform into a mold cavity of a mold, the preform having a strand layer including an interior portion and a peripheral portion surrounding the interior portion. Inserting the preform includes inserting the interior portion of the preform into a molding region of the mold cavity and inserting the peripheral portion of the preform into a relief region of the mold cavity. The method further includes closing the mold following insertion of the preform into the mold cavity, compressing the interior portion of the preform within the molding region in the closed mold, and maintaining the peripheral portion loose within the relief region during compression of the interior portion.

The method may include one or more of the following optional steps. For example, the method may include (i) providing a liquid material to the preform and (ii) infusing at least the strand layer of the preform with the liquid material. In this configuration, providing the liquid material may comprise injecting the liquid material into the molding region of the mold cavity in the closed mold. The method may further include inserting a component comprising a thermoplastic material into the mold cavity prior to closing the mold. Additionally or alternatively, providing the liquid material may comprise, before or after closing the mold, increasing a temperature of the component to a temperature at or above a melting temperature of the thermoplastic material.

In one configuration, the method may further comprise curing the liquid material to a solid polymeric material in the closed mold to form a rigid composite preform including the preform infused with the solid polymeric material, opening the mold after the liquid material is cured, and removing the composite preform from the mold cavity. In this configuration, the method may further include removing the peripheral portion of the composite preform and/or forming the interior portion of the composite preform into a footbed and a trim flange. The footbed and the trim flange may be formed with the same thickness.

The method may further include biasing the preform partially into a recess of the mold cavity. Additionally or alternatively, the preform may comprise the strand layer attached to a substrate.

In another configuration, a method of forming a composite article is provided and includes constructing a preform having a strand layer including an interior portion and a peripheral portion surrounding the interior portion, the strand layer including a plurality of strand segments traversing the interior portion and defining a first strand segment population density in a first area of the interior portion and a second strand segment population density in a second area of the interior portion. The method further includes inserting the preform into a molding region of a mold cavity of a mold including inserting the first area of the interior portion in a first portion of the molding region having a first thickness corresponding to the first strand segment population density and inserting the second area of the interior portion in a second portion of the molding region having a second thickness corresponding to the second strand segment population density. The mold is closed following insertion of the preform into the molding region and the interior portion of the preform is compressed within the molding region in the closed mold.

The method may include one or more of the following optional steps. For example, the method may additionally include (i) providing a liquid material to the preform and (ii) infusing at least the strand layer of the preform with the liquid material. In this configuration, providing the liquid material may comprise injecting the liquid material into the molding region of the mold cavity in the closed mold. The method may further include attaching the strand layer to a substrate comprising a thermoplastic material. Additionally or alternatively, providing the liquid material may comprise, before or after closing the mold, increasing a temperature of the substrate to a temperature at or above a melting temperature of the thermoplastic material.

In one configuration, the method may further include curing the liquid material to a solid polymeric material in the closed mold to form a rigid composite preform including the preform infused with the solid polymeric material, opening the mold after the liquid material is cured, and removing the composite preform from the mold cavity. In this configuration, the method may further include forming the interior portion of the composite preform into a footbed and a trim flange. The footbed and the trim flange may be formed with the same thickness. The method may additionally include removing the peripheral portion of the preform.

The preform may be partially biased into a recess of the mold cavity to form a traction element including the preform. Additionally or alternatively, inserting the preform into the mold cavity may include inserting a peripheral portion of the preform in a relief region of the mold cavity.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIGS. 1A-3D, a mold 100 for forming a composite plate 10 according to the present disclosure is shown. The mold 100 includes an upper mold plate 102 and a lower mold plate 104, which cooperate with each other to define one or more mold cavities 106 when the mold 100 is in a closed position, as shown in FIGS. 3A-3D. As shown in FIG. 1A, the mold 100 is configured to form a pair of mold cavities 106 for forming corresponding medial and lateral plates 10. Thus, the cavities 106 are mirror images of each other, and are otherwise identical in their configurations. Accordingly, only a single one of the mold cavities 106 will be described and shown throughout the application.

In the illustrated example, the upper mold plate 102 includes a first, upper mold surface 108. Similarly, the lower mold plate 104 includes a second, lower mold surface 110, which opposes the upper mold surface 108 of the upper mold plate 102 when the mold 100 is assembled. Each of the upper mold surface 108 and the lower mold surface 110 may be described as including a mold portion 112a, 112b and a parting portion 114a, 114b, whereby the mold portions 112a, 112b cooperate with each other to define the one or more mold cavities 106, while the parting portions 114a, 114b may interface with each other to maintain alignment of the mold plates 102, 104 when the mold 100 is moved between an opened position and the closed position.

In the illustrated example, the mold portion 112a of the upper mold plate 102 is a positive mold portion 112a, while the mold portion 112b of the lower mold plate 104 is a negative mold portion 112b configured to receive the positive mold portion 112a to define the mold cavity 106. Accordingly, thicknesses of each mold cavity 106 are defined by the distance between the opposing mold portions 112a, 112b measured normal to the upper mold surface 108 and the lower mold surface 110, as illustrated in FIGS. 3A-3D. Conversely, widths of the mold cavities 106 are measured in a substantially horizontal direction, irrespective of the profile of the mold surfaces 108, 110.

With reference to FIGS. 3A-3D, the mold cavity 106 may be described as including a molding region 116 and a relief region 118. Generally, the molding region 116 of the mold cavity 106 defines a profile of the plate 10 when the mold 100 is closed, while the relief region 118 provides a space or void around a perimeter of the molding region 116 for accommodating excess material and liquid material. The molding region 116 of the mold cavity 106 may be further described as including a plate-forming region 120 and a trim region 122 surrounding the plate-forming region 120. As discussed in greater detail below, the relief region 118 surrounds the trim region 122 and includes one or more portions 130, 132 having thicknesses $T_{130}$, $T_{132}$ configured to accommodate bunching of the peripheral region of a preform 12 when the mold 100 is in the closed position.

Generally, the plate-forming region 120 is configured for imparting the profile of the molded plate 10, while the trim region 122 is configured to form an outer trim flange 34 circumscribing a periphery of the plate 10. The trim flange 34 can be trimmed or removed from the plate 10 in a post-molding process to provide an exposed, uniform, and clean outer peripheral edge 38 to the plate 10, as discussed below. The plate-forming region 120 may include a central channel region 124, a support region 126 surrounding the central channel region 124, and a peripheral lip region 128 surrounding the support region 126. The central channel region 124 extends longitudinally along the center of the plate-forming region 120 and is configured to form a rib or shank 44 in the molded plate 10. The support region 126 surrounds the central channel region 124, and is configured to form a cupped portion of the plate 10 for receiving and supporting a plantar surface of the foot. The peripheral lip region 128 extends radially outwardly and upwardly from the outer periphery of the support region 126, and is configured to form a lip or rim around the outer periphery of the plate 10, which receives the foot therein to maintain the plate 10 in a constant position relative to the plantar surface of the foot.

Optionally, the plate-forming region 120 may include one or more projection elements 134 configured for forming traction elements 40 in the plate 10. As shown in FIGS. 1A-1C and 3A, the projection elements 134 include upper projection features 134a and corresponding lower projection features 134b that cooperate with each other to form the traction elements 40. Here, the upper projection feature 134a includes a protuberance 134a and the lower projection feature 134b includes a recess 134b configured to receive the protuberance 134a, whereby a portion of the mold cavity 106 formed between the upper and lower projection features 134a, 134b defines a shape or profile of the traction element 40.

Generally, a height of the upper projection features 134a is less than a depth of the corresponding lower projection features 134b such that the upper projection features 134a extend only partially into the lower projection features 134b. Further, a thickness of the mold cavity 106 is greater in a central portion of each of the projection elements 134. For example, a ratio of the thickness $T_{134}$ of the projection element 134 to the thickness $T_{126}$ of the support region 126 may be less than or equal to 3:1. In the illustrated example, the upper projection features 134a are each blunted or rounded and form a hemispherical protuberance while the lower projection features 134b are each pointed and form a conical recess for receiving one of the upper projection features 134a. In other examples, the upper projection features 134a may be a truncated shape, such as a truncated cone or pyramid, while the lower projection features 134b are conical or pyramidal shaped recesses. As discussed in greater detail below, the difference in the height of the upper projection features 134a and the depth of the lower projection features 134b allows the upper projection feature 134b to partially bias a preform 12 into the recess of the lower projection feature 134b during a plate molding process. Accordingly, when resin 16 is injected into the mold cavity 106, the resin 16 encapsulates the preform 12 within the projection feature 134 to form a traction element 40 including the preform 12 and the resin 16.

Figure 1B:
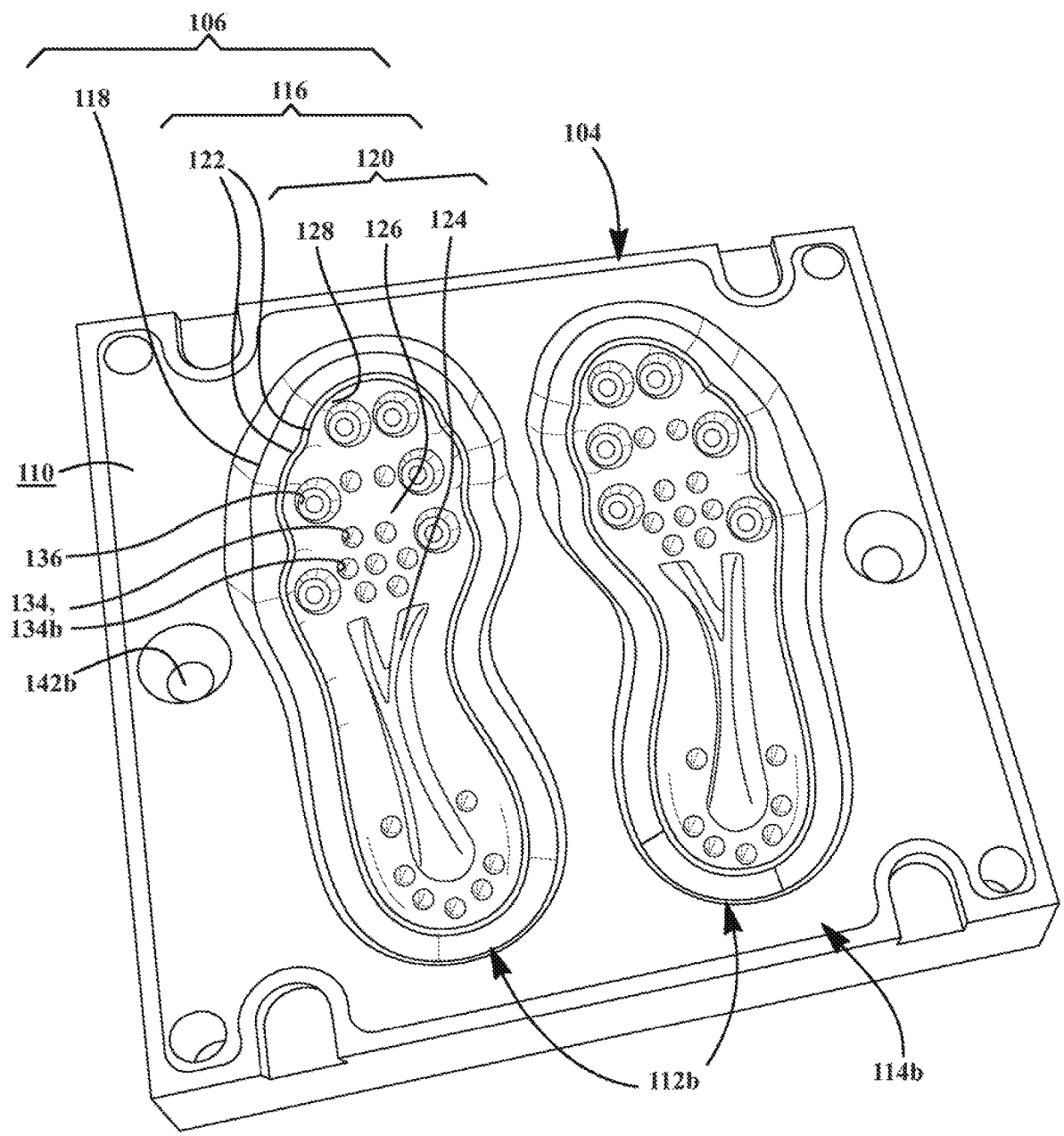
FIG. 1B is a perspective view of a first mold plate of the mold system of FIG. 1A.
Figure 2:
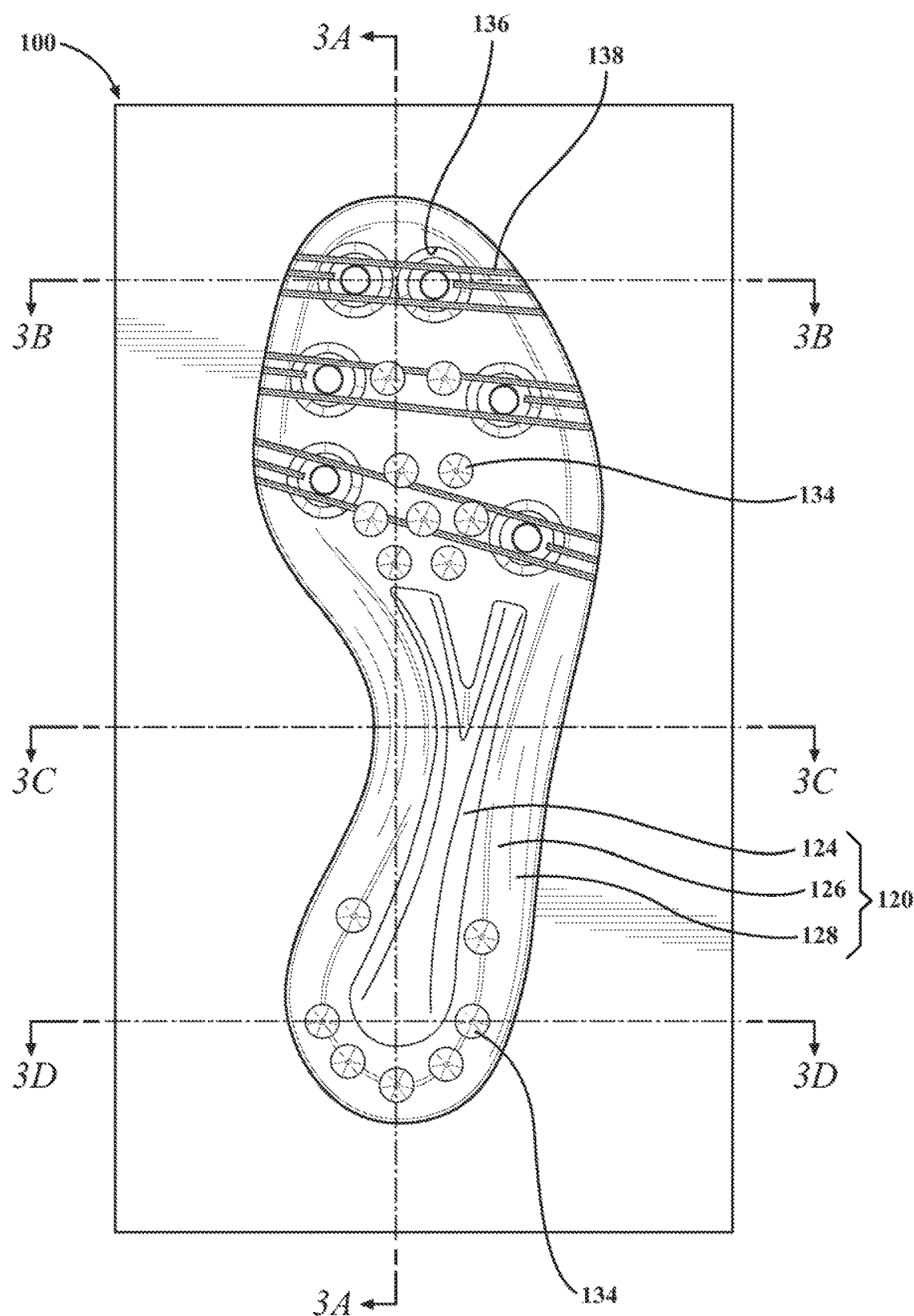
FIG. 2 is a top plan view of the mold system of FIG. 1A.
Figure 3A:
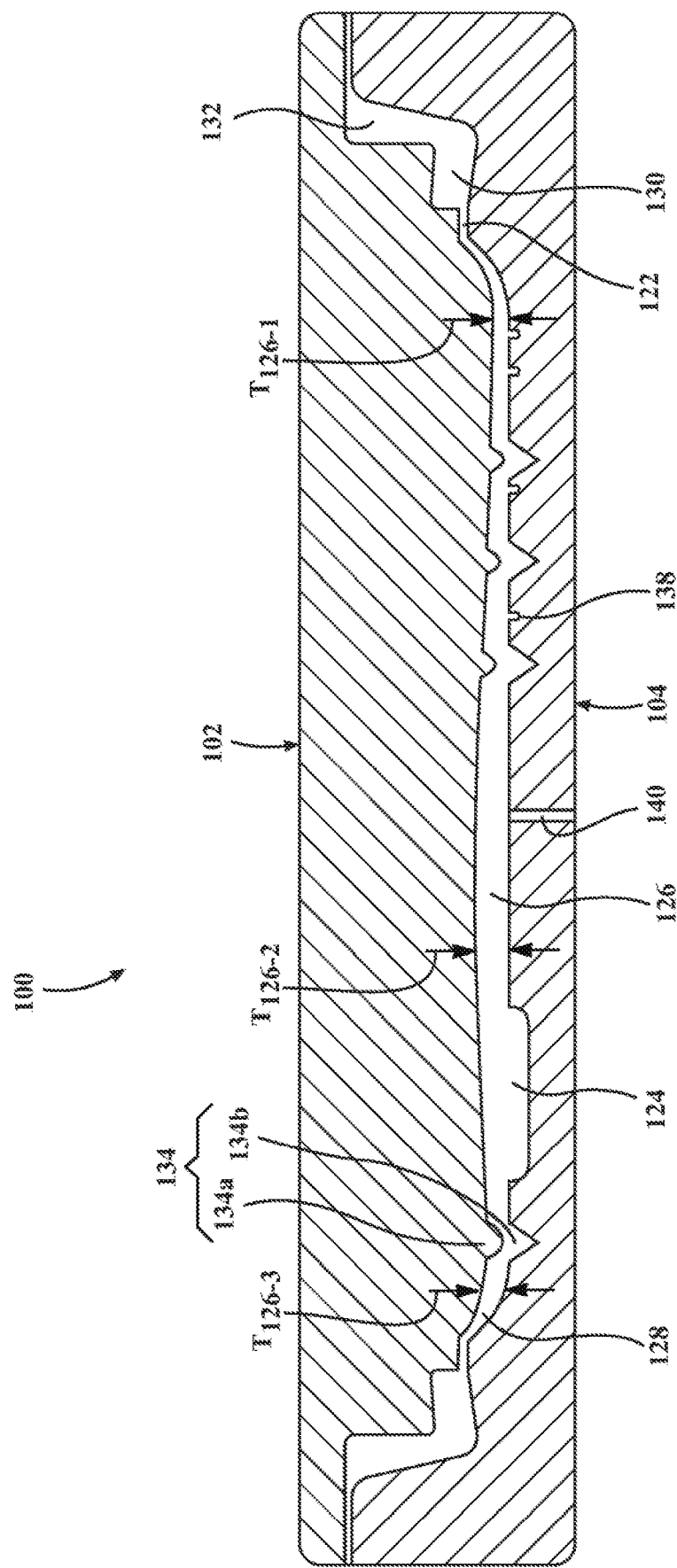
FIG. 3A is a cross-sectional view of the mold system of FIG. 1, taken along Line 3A-3A in FIG. 2.
Figure 3B:
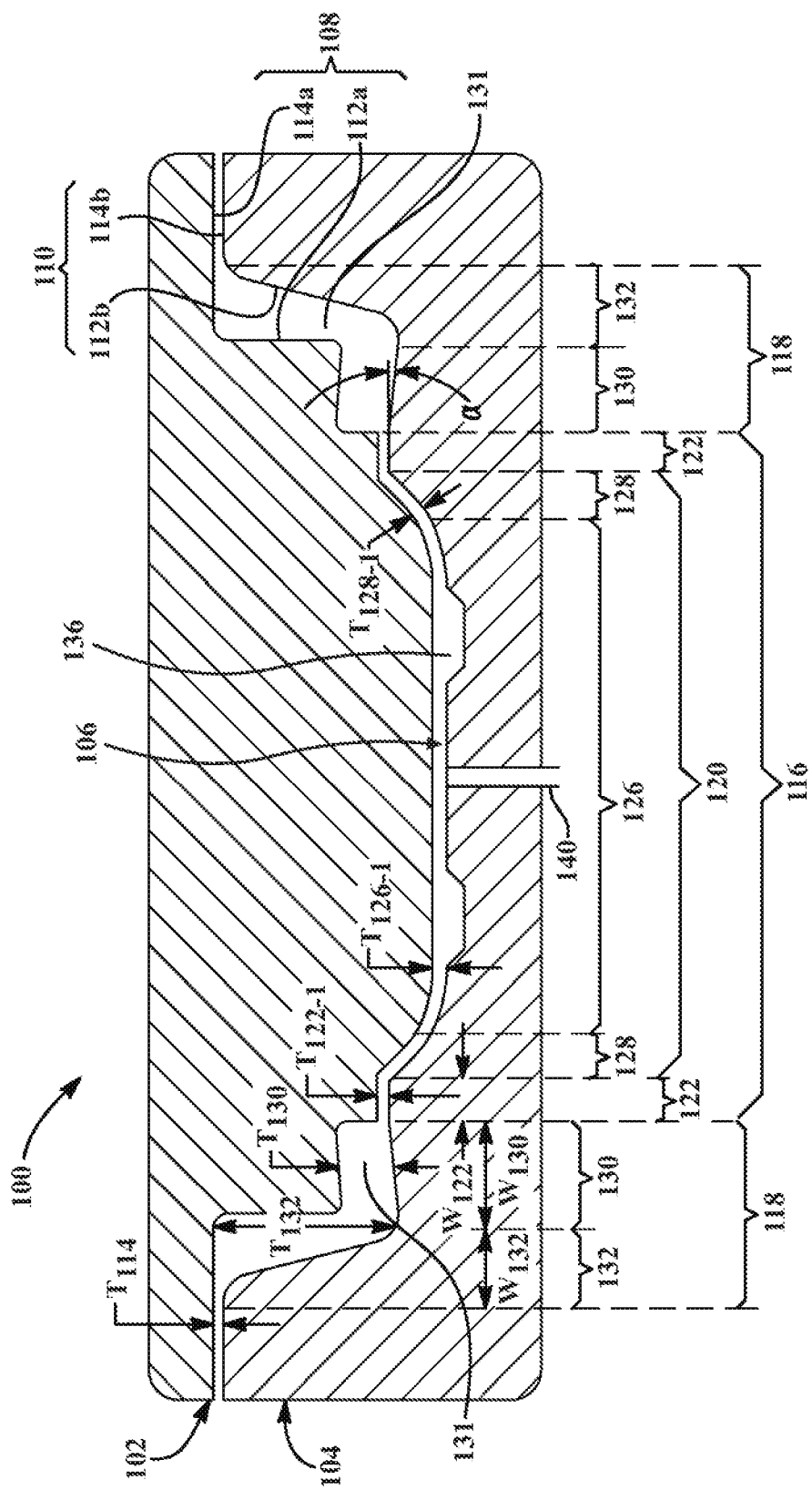
FIG. 3B is a cross-sectional view of the mold system of FIG. 1, taken along Line 3B-3B in FIG. 2.

As best shown in FIGS. 1B, 2, and 3B, the mold cavity 106 may include a plurality of sockets 136 configured for forming bosses 46 on a bottom side of the plate 10. Here, each of the sockets 136 includes a frustoconical recess in the lower surface 110 of the support region 126. The sockets 136 may be configured to receive a cleat component, such as a threaded bushing or a spike. Thus, during the molding process, the cleat component can be integrally molded within the plate 10 by injecting the liquid material 16 around the cleat component within each socket 136. Alternatively, the bosses 46 may be processed (i.e., drilled, cut) after the plate 10 is formed to attach the cleat component to the plate 10. Optionally, the mold cavity 106 may include one or more vents 138 connecting the sockets 136 or other features having an increased thickness to an exterior of the plate-forming region 120. The vents 138 allow air to be evacuated from the mold cavity plate-forming region 120 in areas where the liquid material 16 has a greater thickness (e.g., the sockets 136).

As discussed above, thicknesses of the mold cavity 106 are measured normal to the mold surfaces 108, 110, and are defined by distances between the mold portions 112a, 112b of the upper mold surface 108 and the lower mold surface 110. As shown in FIGS. 3A-3D, the plate-forming region 120 of the mold cavity 106 has a variable thickness defined by a normal distance between the upper mold portion 112a and the lower mold portion 112b in the plate-forming region 120 when the mold 100 is in the closed position. The thicknesses of the plate-forming region 120 correspond to desired thicknesses of the finished plate 10, and may depend on a population density of strand segments 26 in a particular region of the mold cavity 106.

With reference to FIGS. 3A-3D, cross-sectional views are taken along the length (FIG. 3A) and widths (FIGS. 3B-3D) of the mold 100 to illustrate an example of a mold cavity 106 having a plate-forming region 120 with variable thicknesses based on a population density of strand segments 26 within a finished plate 10 (described below). Thicknesses of the plate-forming region 120 may be defined by thicknesses $T_{124}$ of the channel region 124, thicknesses $T_{126}$ of the support region 126, and/or thicknesses $T_{128}$ of the peripheral lip region 128. The thicknesses are dependent on a population density of the strand segments 26 within a particular portion of the mold cavity 106 such that thicknesses are calculated to ensure complete saturation of the strand segments 26 with the resin 16. In some examples, the mold cavity 106 is designed to ensure a weight content of the strand segments 26 does not exceed 70% of the total weight content of any portion of the plate 10. In other words, the thicknesses $T_{124}$, $T_{126}$, $T_{128}$ are selected to ensure a resin content by weight of at least 30%. Thus, thicknesses of the plate-forming region 120 will be greater in areas of the plate-forming region 120 associated with a higher population density of the strand segments 26 than in areas associated with a lower population density of the strand segments 26.

Figure 5A:
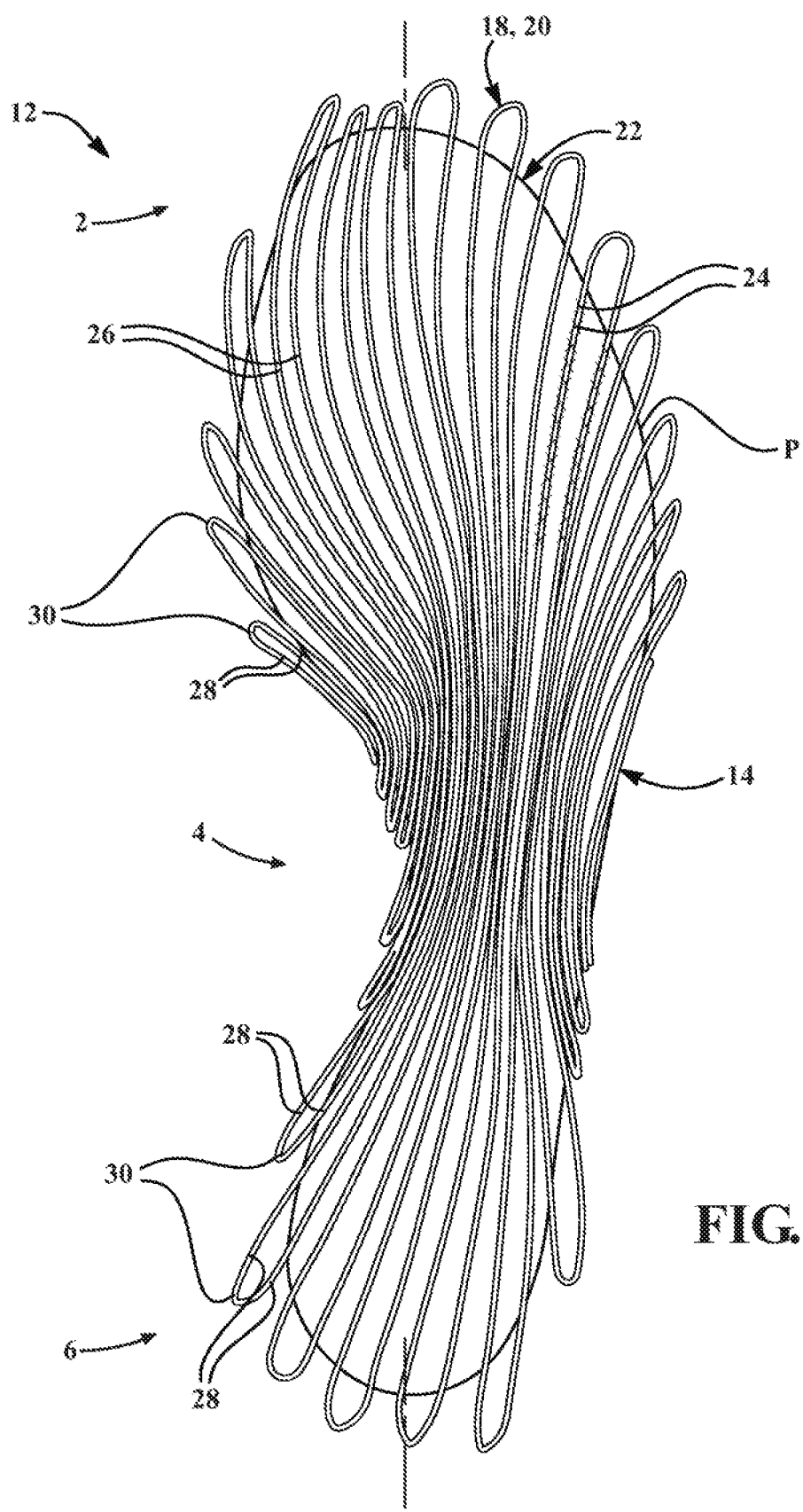
FIG. 5A is a top plan view of a preform for forming a composite plate according to the principles of the present disclosure.
Figure 5B:
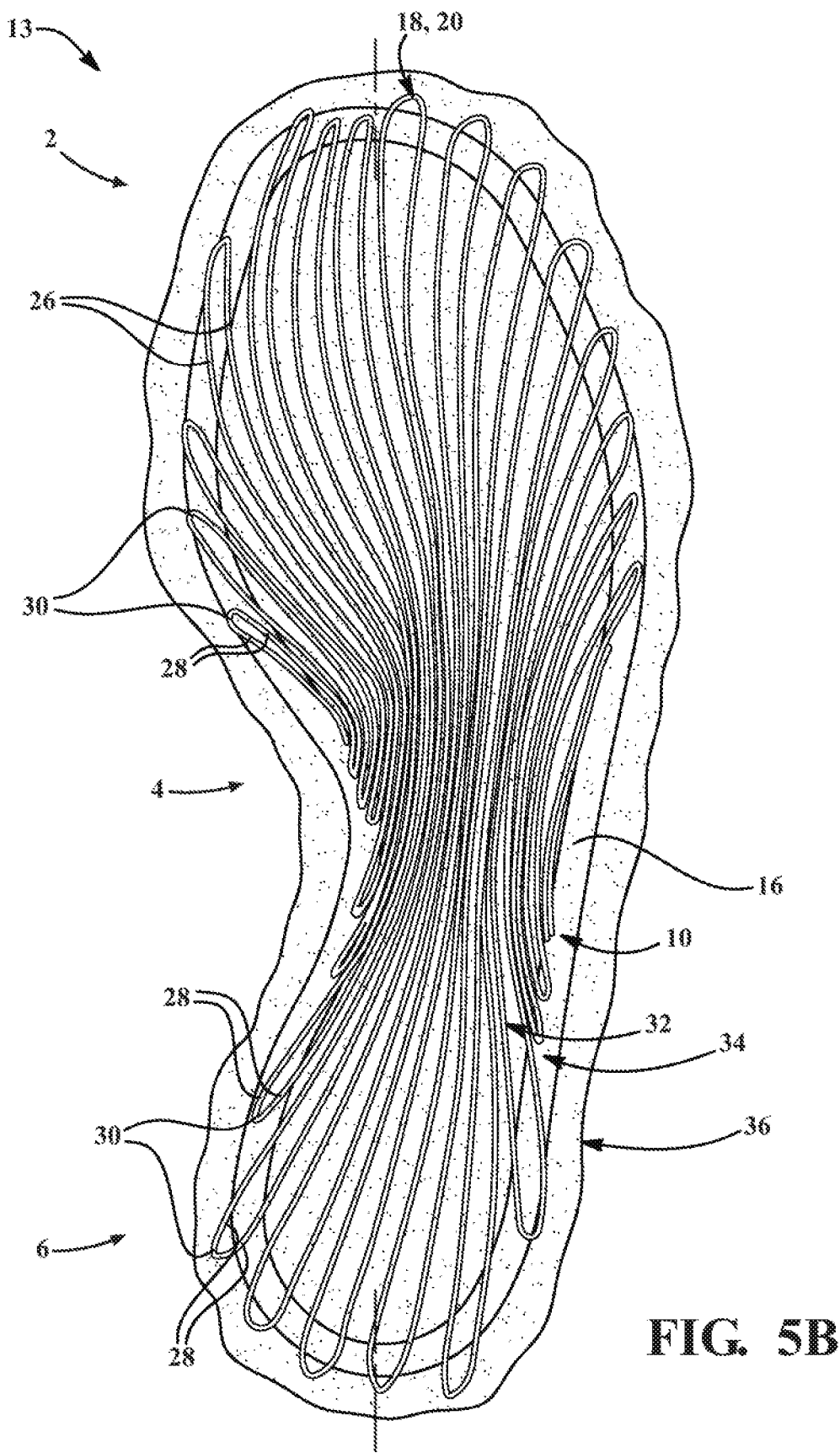
FIG. 5B is a top plan view of the preform of FIG. 5A consolidated with the solid polymeric material.
Figure 5C:
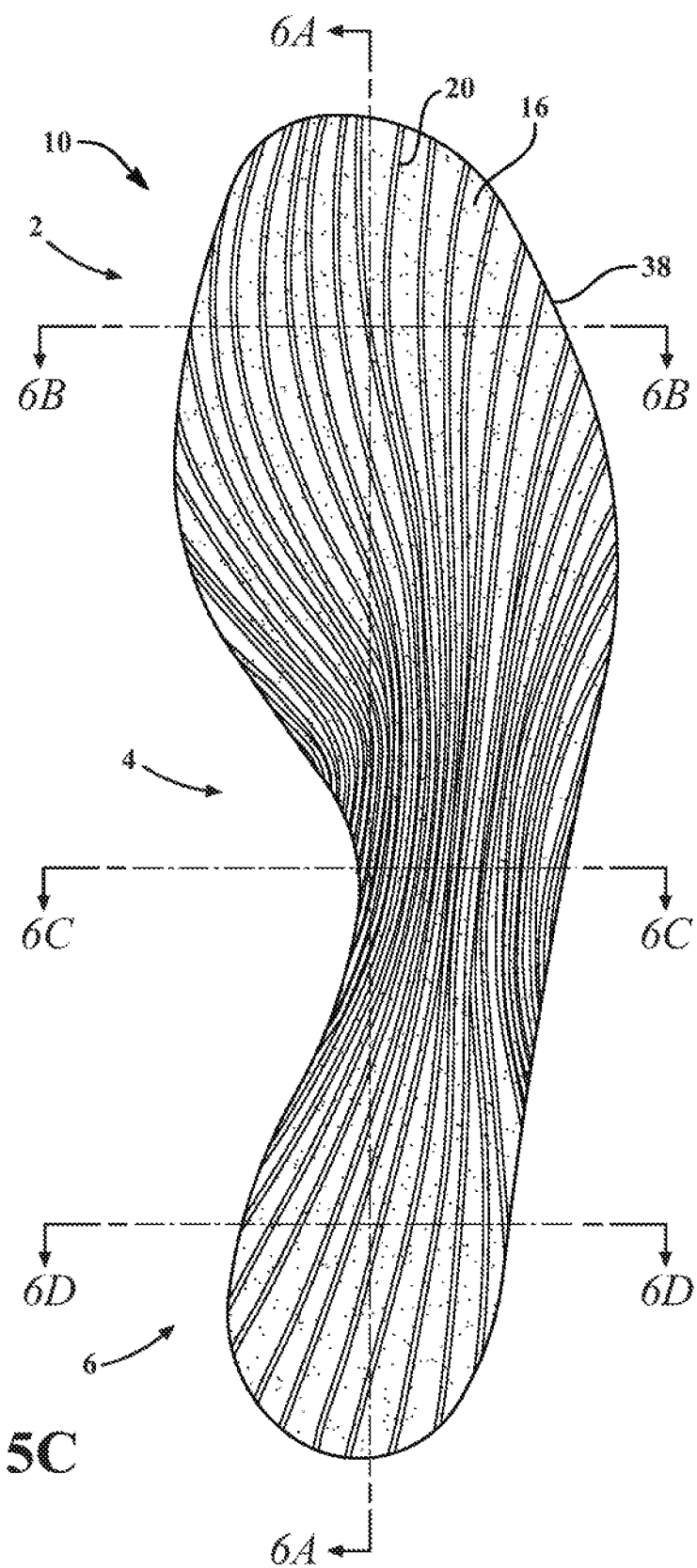
FIG. 5C is a top plan view of a finished composite plate according to the principles of the present disclosure.
Figure 7A:
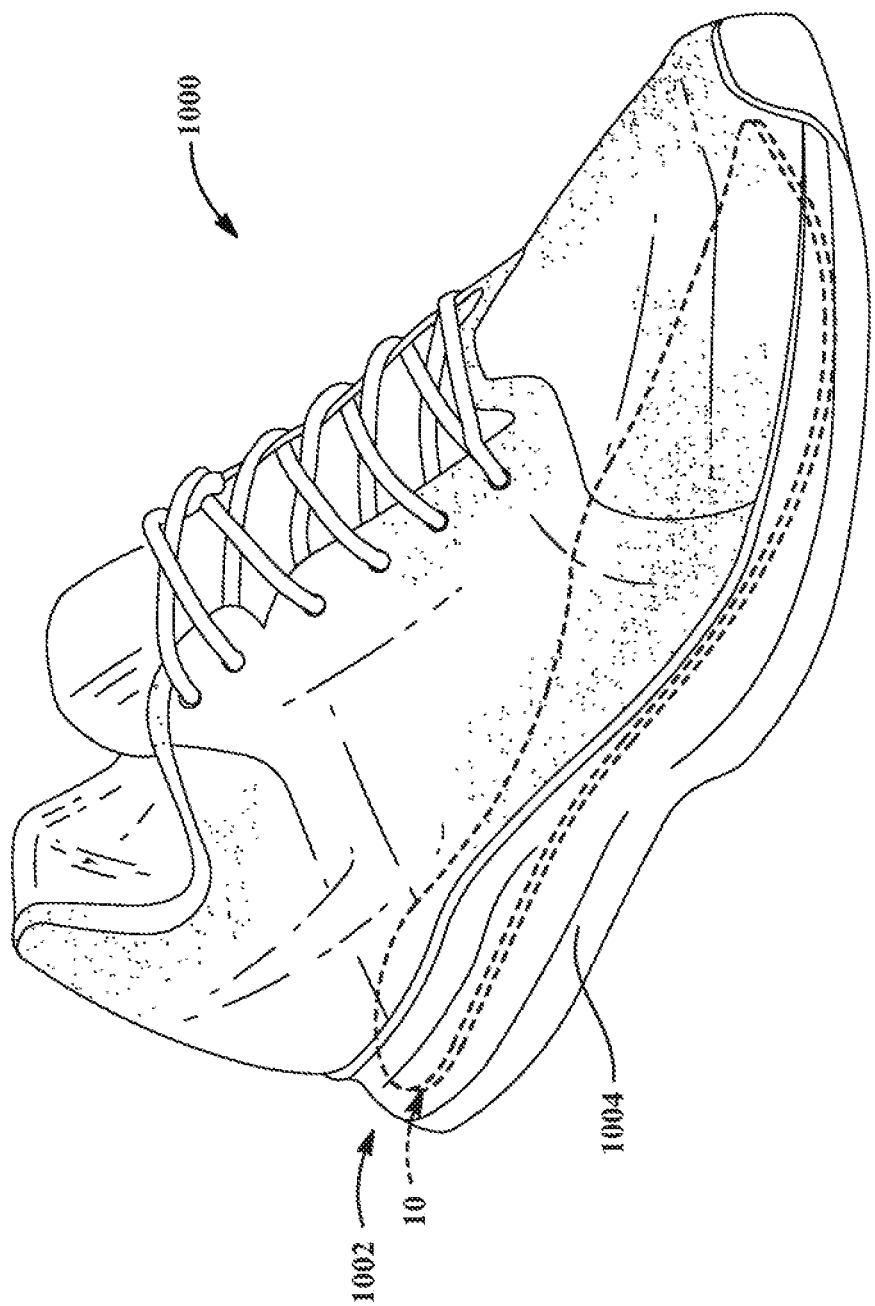
FIG. 7A is a perspective view of an article of footwear including a composite plate according to the principles of the present disclosure.
Figure 7B:
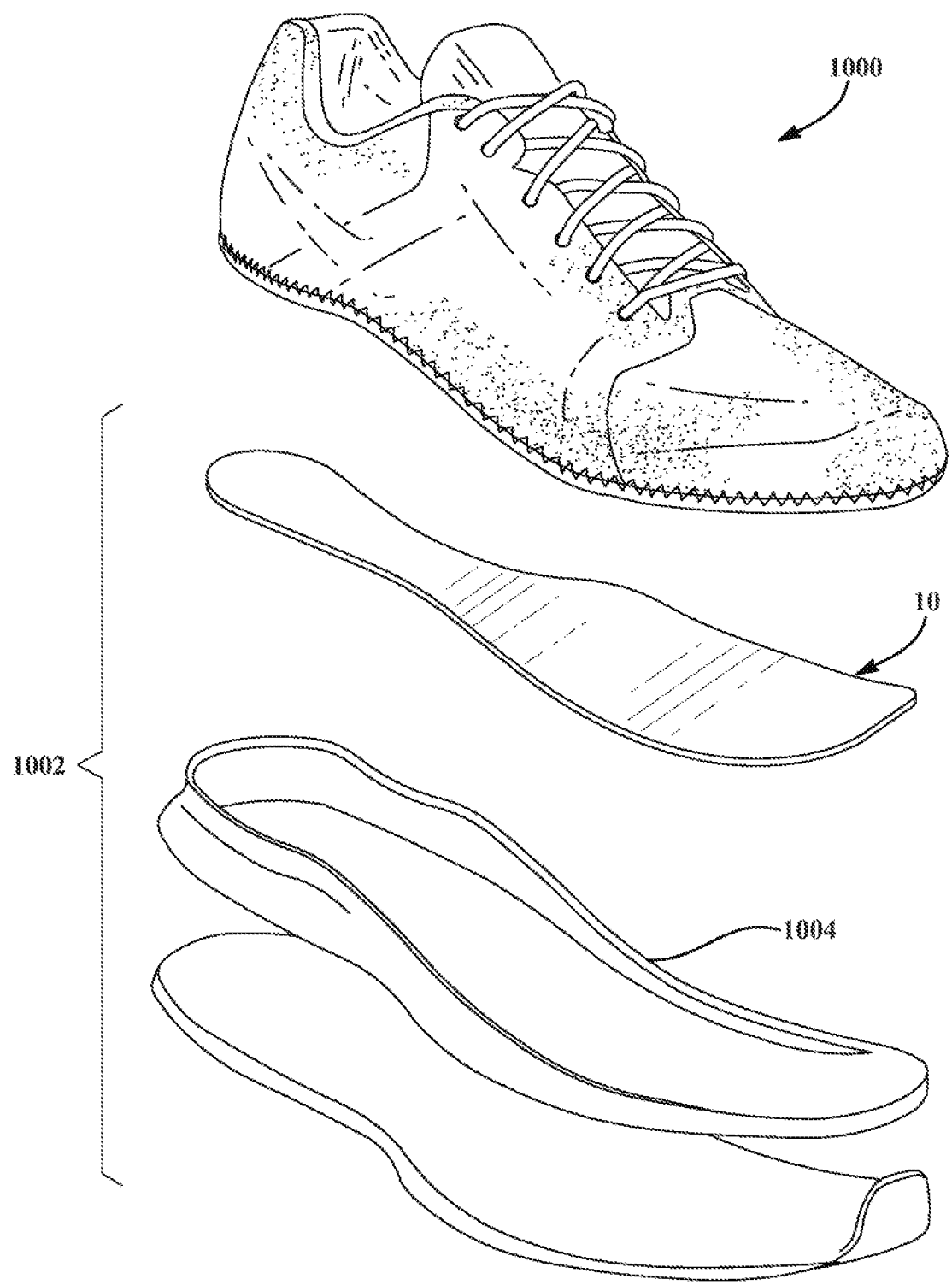
FIG. 7B is an exploded view of the article of footwear of FIG. 7A.

The mold cavity 106 of the present example is configured for forming the composite preform 13 and plate shown in FIGS. 5B and 5C, which include a fiber strand 20 with strand segments 26 that extend along a lengthwise direction (i.e., from an anterior end to a posterior end) of the plate 10. The strand segments 26 of the fiber strand 20 have a first population density associated with a forefoot region 2, a second population density associated with a midfoot region 4, and a third population density associated with a heel region 6. Here, the first population density in the forefoot region 2 is less than the second population density in the midfoot region 4 and greater than the third population density in the heel region 6.

With reference to FIG. 3A, the support region 126 of the mold cavity 106 has thicknesses $T_{126-1}$, $T_{126-2}$, $T_{126-3}$ that correspond to the population densities of the fiber strand segments 26 in each region 2, 4, 6 of the plate 10. Thus, the support region 126 includes a first support region thickness $T_{126-1}$ in the forefoot region 2 corresponding to the first population density, a second support region thickness $T_{126-2}$ in the midfoot region 4 corresponding to the second population density, and a third support region thickness $T_{126-3}$ in the heel region 6 corresponding to the third population density. Here, the first support region thickness $T_{126-1}$ is less than the second support region thickness $T_{126-2}$ and greater than the third support region thickness $T_{126-3}$. As shown, the thickness $T_{126}$ of the support region 126 includes gradients or tapers between the thicknesses $T_{126-1}$, $T_{126-2}$, $T_{126-3}$ that correspond to changes in the population densities. Thus, the mold cavity 106 transitions from one of the thicknesses $T_{126-1}$, $T_{126-2}$, $T_{126-3}$ to the other of the thicknesses $T_{126-1}$, $T_{126-2}$, $T_{126-3}$ according to the pattern of the strand segments 26.

Figure 3C:
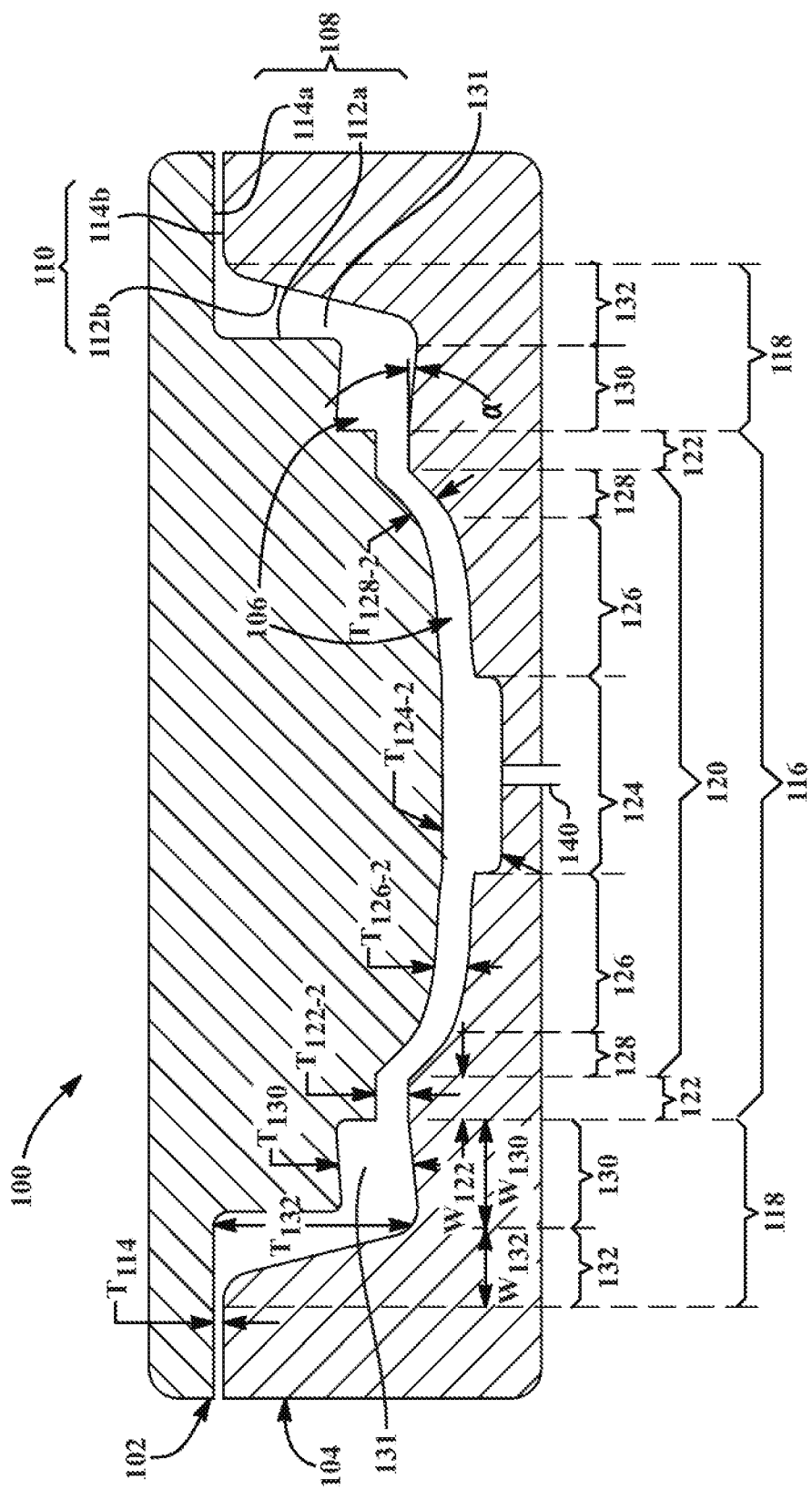
FIG. 3C is a cross-sectional view of the mold system of FIG. 1, taken along Line 3C-3C in FIG. 2.
Figure 3D:
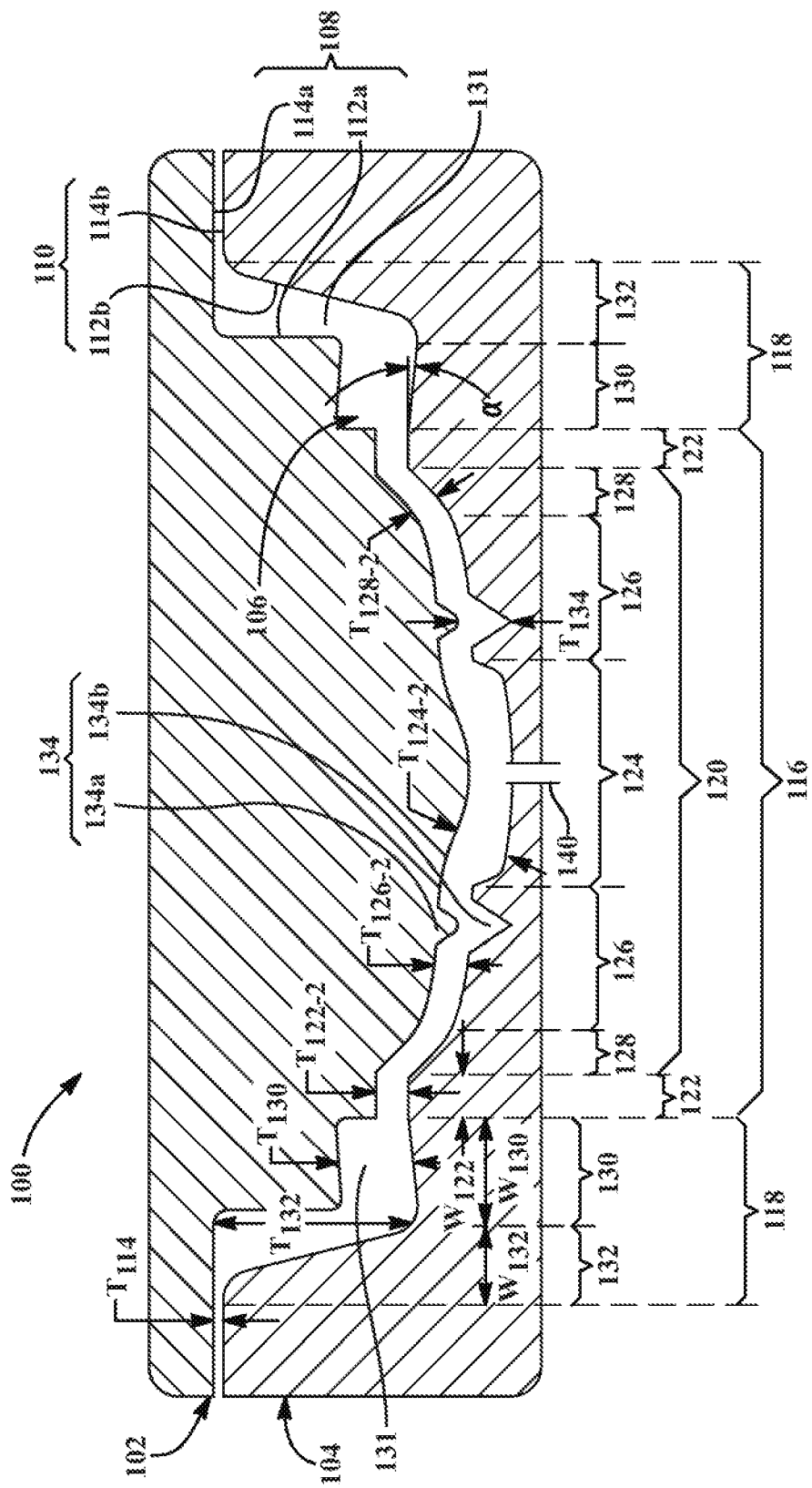
FIG. 3D is a cross-sectional view of the mold system of FIG. 1, taken along Line 3D-3D in FIG. 2.

Referring to FIGS. 3B-3D, thicknesses of the mold cavity may also vary across a widthwise direction of the mold cavity 106 in one or more of the regions 2, 4, 6. For example, in the forefoot region 2 (FIG. 3B), the mold cavity 106 may have the first support region thickness $T_{126-1}$ in the central portion and a first peripheral lip thickness $T_{128-1}$ in the peripheral lip region 128. The first peripheral lip thickness $T_{128-1}$ may be the same as or different from the first support region thickness $T_{126-1}$ depending on the population density of the strand segments 26 of the plate 10 across the width of the plate 10. Thus, where the strand segments 26 are evenly spaced across the width of the plate 10, the mold cavity 106 will have a first support region thickness $T_{126-1}$ that is the same as the first peripheral lip thickness $T_{128-1}$.

In the midfoot region 4 (FIG. 3C), the plate forming region 120 includes the second support region thickness $T_{126-2}$ along with a second peripheral lip thickness $T_{128-2}$ and a channel thickness $T_{124-2}$. Similarly, the heel region 6 (FIG. 3D) of the plate forming region 120 includes the third support region thickness $T_{126-3}$ along with a third peripheral lip thickness $T_{128-3}$ and a second channel thickness $T_{124-3}$. As with the forefoot region 2, the support region thicknesses $T_{126-2}$, $T_{126-3}$ and the corresponding peripheral lip thicknesses $T_{128-2}$, $T_{128-3}$ may be the same or variable depending on the population density of the strand segments 26 in a particular area of the plate 10. The channel thicknesses $T_{124-2}$, $T_{124-3}$ may be greater than the support region and peripheral lip thicknesses $T_{126-2}$, $T_{126-3}$, $T_{128-2}$, $T_{128-3}$ for forming the rib or shank 44 on the bottom side of the plate 10.

Referring to FIG. 3D, the mold cavity 106 may further include an increased thickness $T_{134}$ at each of the projection elements 134. As discussed above, the upper projection features 134a include a rounded or hemispherical shape while the lower projection features 134b have a pointed or conical shape such that a thickness $T_{134}$ of the mold cavity 106 associated with the projection elements 134 increases in a direction from the outer periphery of the projection element 134 to a central point of the projection element 134. The thickness $T_{134}$ of the projection element 134 at the central point is greater than a thickness of the mold cavity 106 immediately adjacent to and surrounding the projection element 134. For example, the thickness $T_{134}$ of the projection element 134 may be as much as three times greater than the thickness $T_{126}$ of the immediately adjacent portion of the support region 126.

Referring to FIG. 3B, the trim region 122 of the mold cavity 106 has a thickness $T_{122}$ defined by a normal distance between the upper mold surface 108 and the lower mold surface 110 in the trim region 122 when the mold 100 is in the closed position. In the illustrated example, the thickness $T_{122}$ of the trim region 122 is the same as the first thickness $T_{128}$ of the peripheral lip region 128. In some examples, the trim region 122 has a width $W_{122}$ of at least 3 mm to provide a sufficient width of material for a trimming process, as described in greater detail below. The trim region 122 may be formed as a horizontal structure or may be tangent (i.e., continuous) to the peripheral lip region 128 of the mold cavity 106.

With continued reference to FIG. 3B, the relief region 118 of the mold cavity 106 may include a lateral portion 130 disposed adjacent to and surrounding the trim region 122, and a vertical portion 132 surrounding the lateral portion 130. Generally, the lateral portion 130 has a third thickness $T_{130}$, and a width $W_{130}$ that is greater than its thickness $T_{130}$. The vertical portion includes a fourth thickness $T_{132}$ that is greater than its width $W_{132}$, as shown in FIG. 3B. However, in other examples, the relief region 118 may have a constant thickness $T_{130}$ that is greater than the thicknesses $T_{126}$, $T_{128}$ of the plate-forming region 120.

The upper mold surface 108 and the lower mold surface 110 are spaced apart from each other by a greater distance in the lateral portion 130 of the relief region 118 than in the molding region 116. As such, the lateral portion 130 of the relief region 118 has a thickness $T_{130}$ that is greater than the thicknesses $T_{128}$ of the peripheral lip region 128 of the plate-forming region 120 and the thickness $T_{122}$ of the trim region 122. Particularly, the lateral portion 130 of the relief region has a thickness $T_{130}$ that is at least 0.7 mm greater than the thickness $T_{122}$ of the trim region 122 and a width $W_{130}$ of at least 12 mm, thereby providing sufficient volume for accommodating the excess structure and liquid material/solid polymeric material used in forming the plate 10. Accordingly, the lateral portion 130 of the relief region 118 defines a peripheral void or space 131 surrounding the molding region 116, whereby subcomponents of the preform 12 of the plate 10 disposed within the relief region 118 will remain loose and uncompressed when the mold 100 is moved into the closed position. Optionally, the vertical portion 132 may have a fourth thickness $T_{132}$ that is greater than the third thickness $T_{130}$ of the lateral portion 130. Thus, the relief region 118 may form an L-shaped stack connecting the trim region 122 and the parting portion 114a, 114b.

As shown, the portion of the lower mold surface 110 defining lateral portion 130 of the relief region 118 may be continuous and flush with the portion of the lower mold surface 110 defining the trim region 122. Conversely, the portion of the upper mold surface 108 defining the lateral portion 130 of the relief region 118 may be vertically offset from the portion of the upper mold surface 108 defining the trim region 122, thereby providing the lateral portion 130 of the mold cavity 106 with the greater thickness $T_{130}$ than the trim region 122.

Generally, the thicknesses, $T_{122}$, $T_{126}$, $T_{128}$, $T_{130}$, $T_{132}$ of the mold cavity 106 are selected to ensure that sufficient pressure is maintained within the plate-forming region 120, while ensuring that the mold 100 is capable of fully closing. The thickness $T_{122}$ of the trim region 122 can range from the thickness $T_{128}$ of the peripheral lip region 128 to the thickness $T_{130}$ of the lateral portion 130 of the relief region. For example, as illustrated, the second thickness $T_{122}$ of the trim region 122 may be the same as the thickness $T_{128}$ of the peripheral lip region 128. Here, the plate 10 will also be compressed by the opposing mold portions 112a, 112b within the trim region 122 of the mold cavity 106 when the mold 100 is moved to the closed position. However, in other examples, the thickness $T_{122}$ of the trim region 122 may be different from the thickness $T_{128}$ of the peripheral lip region 128 of the plate-forming region 120. For example, the thickness $T_{122}$ of the trim region 122 may be greater than the thickness $T_{128}$ of the peripheral lip region 128 and, more particularly, the thickness $T_{122}$ of the trim region 122 may be the same as the thickness $T_{130}$ of the lateral portion 130. In this implementation, the trim region 122 and the relief region 118 will have a substantially constant thickness $T_{122}$. Thicknesses for the trim region 122 and the relief region 118 may be selected to accommodate complexities of a particular configuration of the preform 12.

In some examples, the portions of the upper and lower mold surfaces 108, 110 forming the mold cavity 106 may be formed at a constant angle α relative to a horizontal datum of the mold 100. In some examples, the angle α may be an oblique angle relative to the horizontal datum. For example, the upper and lower mold surfaces 108, 110 may be formed at a decline in the trim region 122 and the lateral portion 130 of the relief region 118. Particularly, the upper and lower mold surfaces 108, 110 may decline along the direction from the center of the mold cavity 106 to the outer periphery of the mold cavity 106, as illustrated in FIG. 3A. In other examples, the mold surfaces 108, 110 may be formed parallel to the horizontal datum in the trim region 122 and the lateral portion 130 of the relief region 118, such that the angle α is 0°. Alternatively, the portions of the upper and lower mold surfaces 108, 110 defining the trim region 122 may be tangent or continuous with the portions of the upper and lower mold surfaces 108, 110 forming the outer peripheral lip region 128.

Figure 1C:
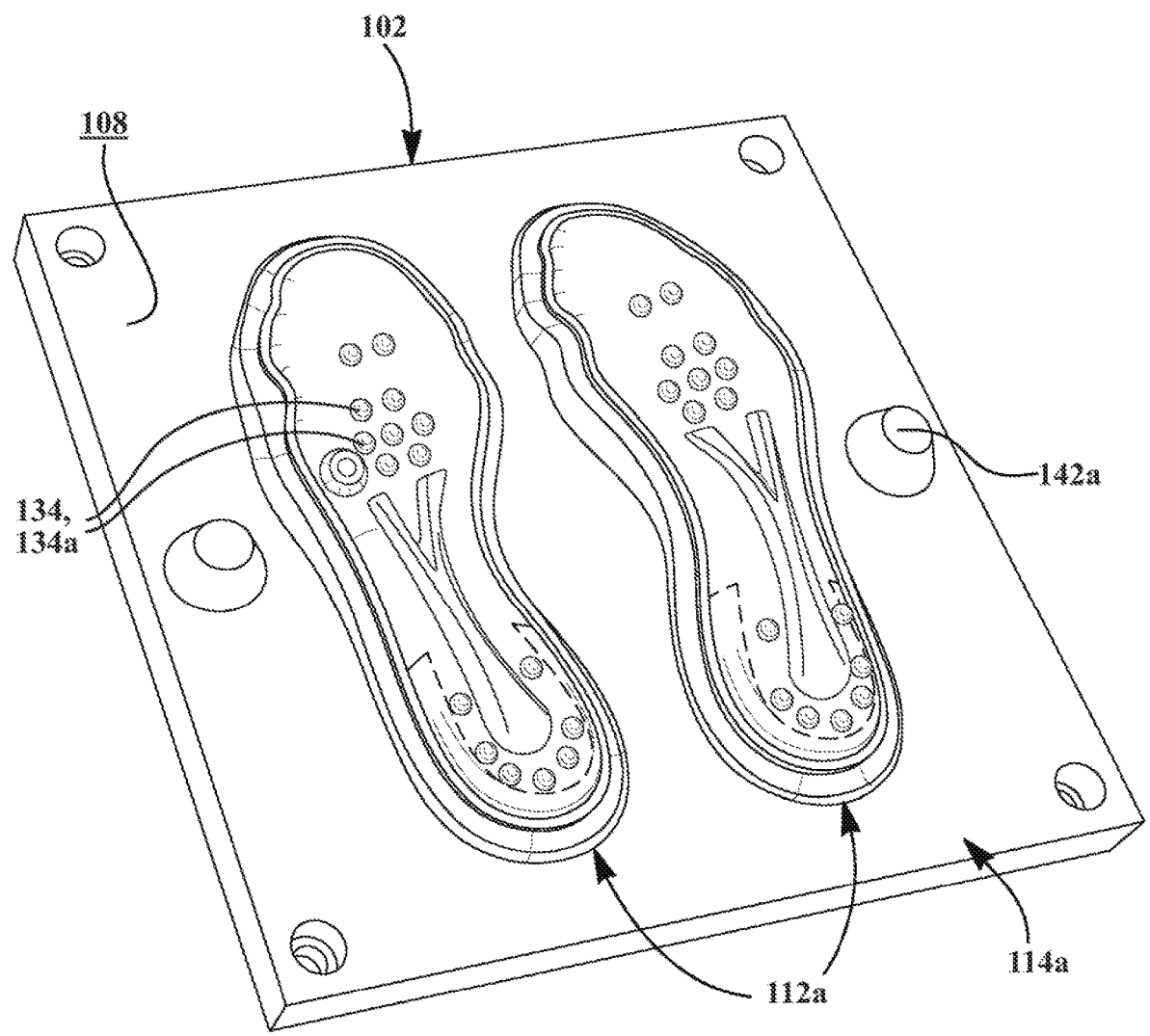
FIG. 1C is a perspective view of a second mold plate of the mold system of FIG. 1A.

Referring still to FIG. 3B, the upper mold surface 108 is configured to be spaced apart from the lower mold surface 110 in the parting portion 114a, 114b when the mold 100 is in the closed position to define a parting thickness $T_{114}$. In some examples, the parting thickness is approximately 0.25 mm. The parting portion 114a, 114b may include one or more guide features 142a, 142b configured to maintain alignment between the upper mold plate 102 and the lower mold plate 104, as shown in FIGS. 1A-1C.

The upper mold plate 102 and the lower mold plate 104 are at least partially formed of materials suitable for use in injection molding processes. In some examples, the mold plates 102, 104 are formed entirely of a first material. In other examples, the upper mold plate 102 and/or the lower mold plate 104 may be formed as composite plates, wherein a first portion is formed of a first material and a second portion is formed of a second material. For example, the portion of the mold plate 102, 104 defining mold cavity 106 may be formed of the first material, while an outer shell of the mold plate 102, 104 may be formed of a different material. Materials used for forming the mold plates 102, 104, and particularly, the mold cavity 106, will exhibit favorable properties related to hardness, polishing ability, corrosion resistance, and thermal stability/conductivity. For example, metallic materials may be used for forming the mold plates 102, 104. In some examples, tool steel or aluminum may be used in forming the mold.

With reference to FIGS. 5A-6D, the plate 10 is formed of a preform 12 having one or more layers 14 bonded by a solid polymeric material 16. As explained in greater detail below, each of the layers 14 includes at least one ply 18 having one or more strands 20 of fibers arranged on a substrate 22 in selected patterns to impart stiffness and gradient load paths throughout the plate 10. Only a single ply 18 is shown in the example of FIG. 5A. However, each layer 14 may be formed with various quantities and arrangements of the plies 18 to impart desired torsional properties to the finished plate 10.

Each strand 20 may refer to a tow of a plurality of fibers, a monofilament, yarn, or polymer pre-impregnated tows. As used herein, the term "tow" or "strand" refers to a bundle (i.e., plurality of filaments (e.g., fiber) that may be twisted or untwisted and each tow may be designated a size associated with a number of fibers the corresponding tow contains. For instance, a single strand 20 may range in size from about 1,000 fibers per bundle to about 48,000 fibers per bundle.

In some configurations, the fibers associated with each strand 20 include at least one of carbon fibers, boron fibers, glass fibers, and polymeric or thermoplastic fibers. Fibers such as carbon fibers, aramid fibers, and boron fibers may provide a high Young's modulus while glass fibers (e.g., fiberglass) and polymer fibers (e.g., synthetic fibers) provide a medium modulus. Additionally or alternatively, each strand 20 may be provided with first fibers comingled with second fibers, whereby the second fibers have one or more of a different length, thickness, melting temperature, and/or Young's modulus than the first fibers. For example, the strand 20 may include a plurality of carbon fibers and a plurality of thermoplastic fibers that, when heated above their melting point, form a liquid material that infuses the carbon fibers, and solidifies into a solid polymeric material which consolidates and holds the carbon fibers in a desired shape and position relative to one another.

As used herein, the substrate 22 refers to any one of a veil, carrier, or backer to which at least one strand 20 of fibers is attached. The substrate 22 may be formed from a thermoset polymeric material or a thermoplastic polymeric material and can be a textile (e.g., knit, woven, or non-woven), an injection molded article, a fabric-reinforced thermoplastic article (organo sheet), or a thermoformed article.

The strands 20 of fibers forming the plies 18 of each layer 14 may be affixed to the same or separate substrates 22 and embroidered in a layered configuration. When forming the layers 14 of the plate 10, the strand or strands 20 of the plies 18 may be applied directly to the substrate 22, and may be attached to the substrate 22 using stitching 24 to hold the strands 20 in a desired location. In some examples, the stitching 24 may include a continuous zig-zag stitch extending along the strand. Alternatively, the stitching 24 may be provided at discrete attachment points spaced along the strand 20.

The stitching 24 may be formed from the same material as the substrate 22. Alternatively, the stitching 24 may be formed from a different material than the material forming the substrate 22 such that the stitching 24 is associated with a higher melting point than the substrate 22. Providing the stitching 24 with a higher melting point than the substrate 22 allows the stitching 24 to melt after the substrate 22 when heat is applied during formation of the plate 10. In some examples, the stitching 24, or at least a portion thereof, is formed from a thermoplastic material.

Referring to FIG. 5A, the plies 18 of the preform 12 each include at least one torsion strand 20 wound in a serpentine configuration, such that each strand 20 includes a plurality of segments 26 distributed throughout the ply 18. Each of the segments 26 includes arcuate portions and is initially connected to adjacent ones of the segments 26 by loops 30 at each end. As such, a single strand 20 may form the entire ply 18. In the example of FIG. 5A, the strand 20 includes the loops 30 disposed outside a peripheral edge P of the substrate for connecting adjacent segments 26 of the strand 20. As shown, the segments 26 extend through an interior portion of the preform 12 corresponding to a location of a footbed 32 (FIG. 5B), while the loops 30 form a peripheral portion of the preform 12.

Figure 4A:
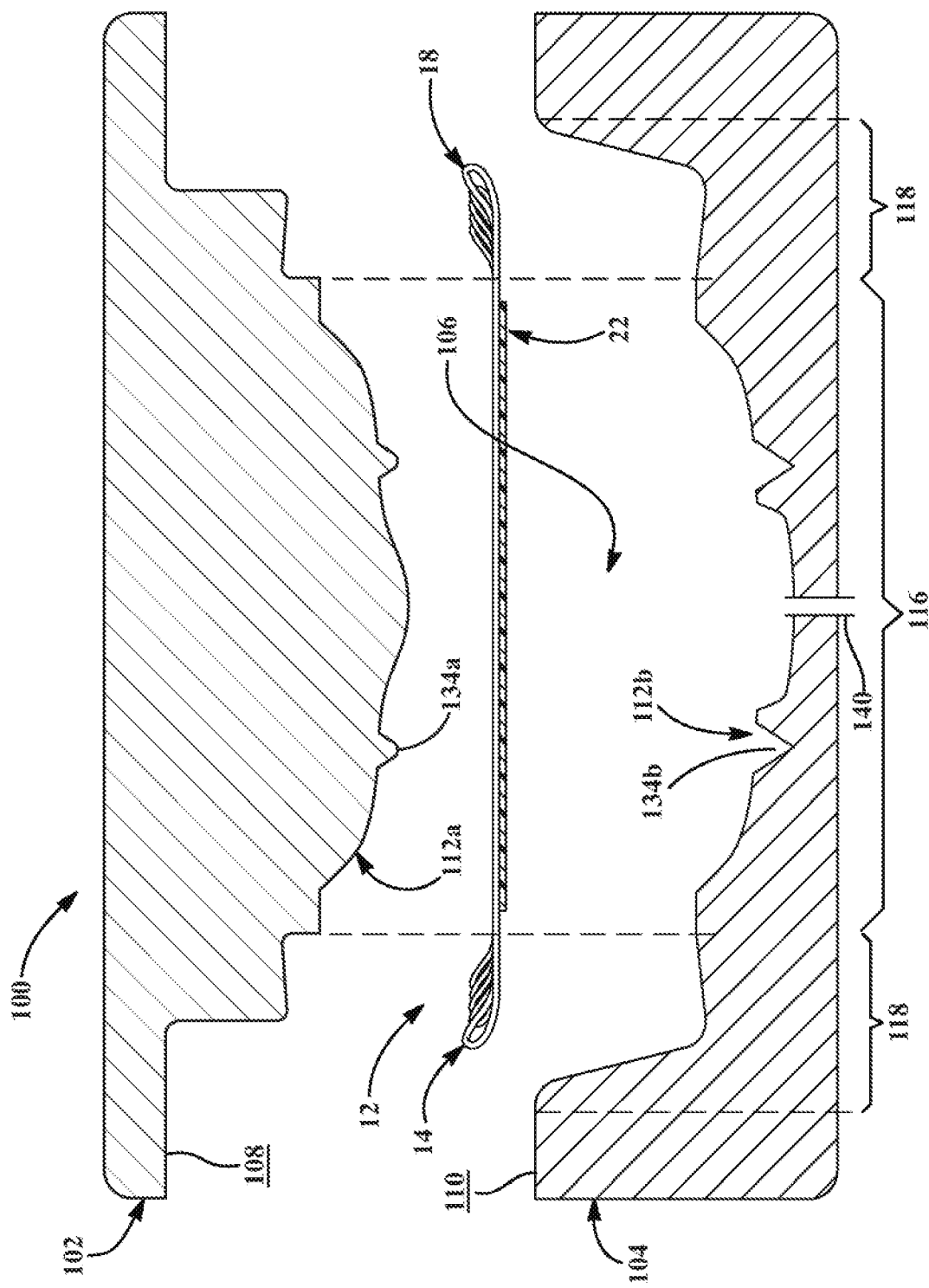
FIG. 4A is a cross-sectional view of the mold system of FIG. 1, showing the mold system in an opened position with a preform disposed within the mold cavity.
Figure 4B:
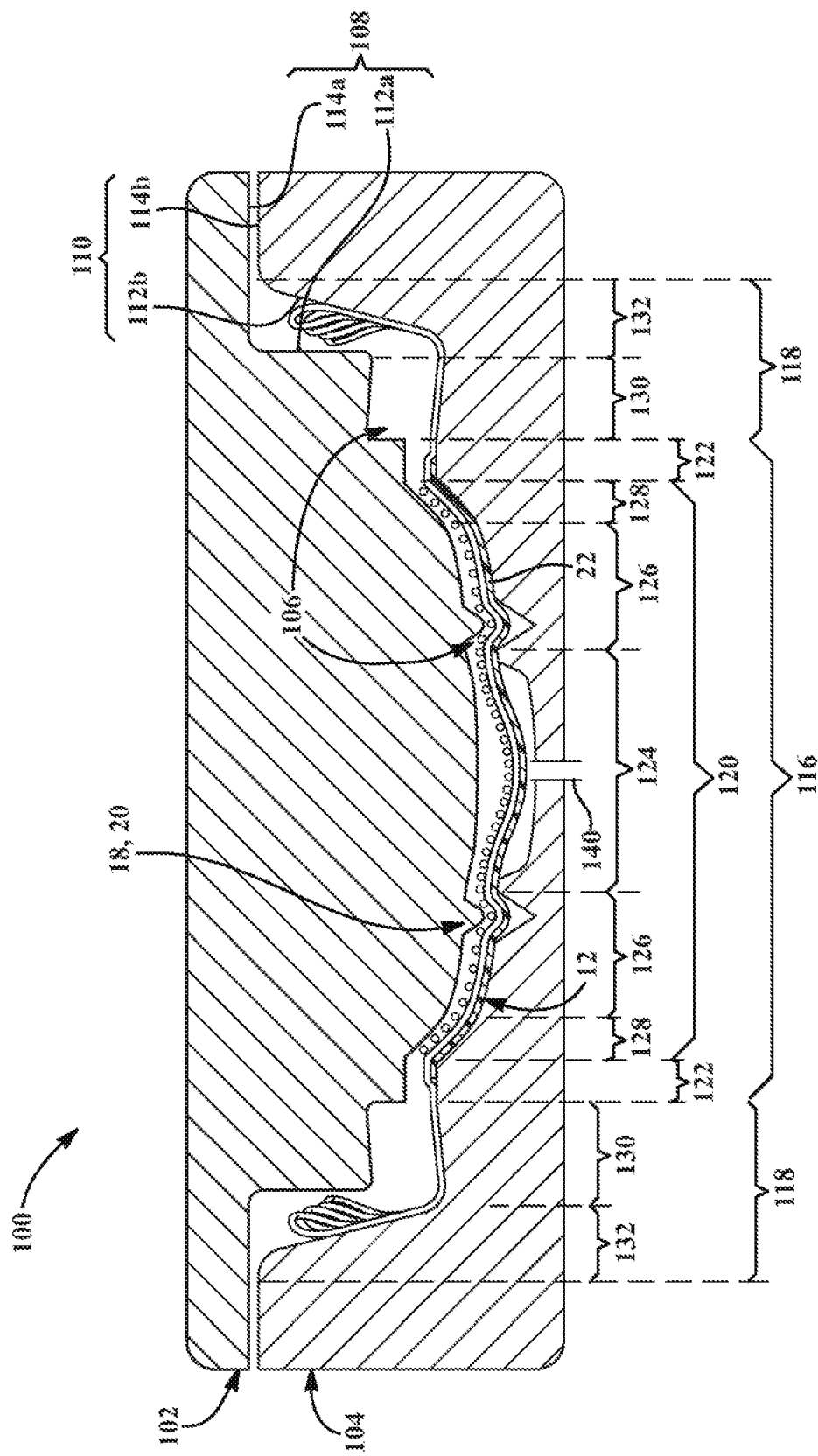
FIG. 4B is a cross-sectional view of the mold system of FIG. 1, showing the mold system in the closed position with the preform disposed within the mold cavity.

With reference to FIGS. 4A and 4B, once the preform 12 is constructed using the desired quantity and configurations of plies 18 and substrates 22, the assembled preform 12 is positioned within the mold cavity 106 (FIG. 4A) and the mold 100 is moved to the closed position (FIG. 4B) to compress the preform 12 within the plate-forming region 120. The preform 12 is aligned within the mold cavity 106 so that a peripheral portion of the substrate 22 extends at least partially into the trim region 122 of the mold cavity 106 when the mold 100 is moved to the closed position. Accordingly, the ends 28 and the loops 30 of the strands 20 will extend into the interior void 131 formed by the relief region 118 of the mold cavity 106. Here, the interior void 131 is sized so that the ends 28 and loops 30 of the strands 20 can loosely bunch within the relief region 118 without forming pinch points or frustrating the arrangement of the strands 20 within the molding region. In some instances, compression of the preform 12 within the plate-forming region 120 causes a portion of the preform 12 to be displaced from the plate-forming region 120 and into the trim region 122 and/or the relief region 118. Accordingly, the relief region 118 may be sized to accommodate the displaced preform materials.

With continued reference to FIG. 4B, when the mold 100 is in the closed position, the preform 12 is pushed or biased partially into the lower projection features 134b by the upper projection features 134a. For example, as discussed above, the upper projection features 134a are formed as blunted or rounded protuberances having a height that is less than a depth of the corresponding lower projection features 134b such that the distal ends of the upper projection features 134a are spaced apart from the bottom tips of the lower projection features 134b. Accordingly, when the mold 100 is closed, the preform is pushed partially into the recesses formed by the lower projection features 134b, but is spaced apart from the bottom tip of the lower projection features 134b by a gap or void.

Figure 4C:
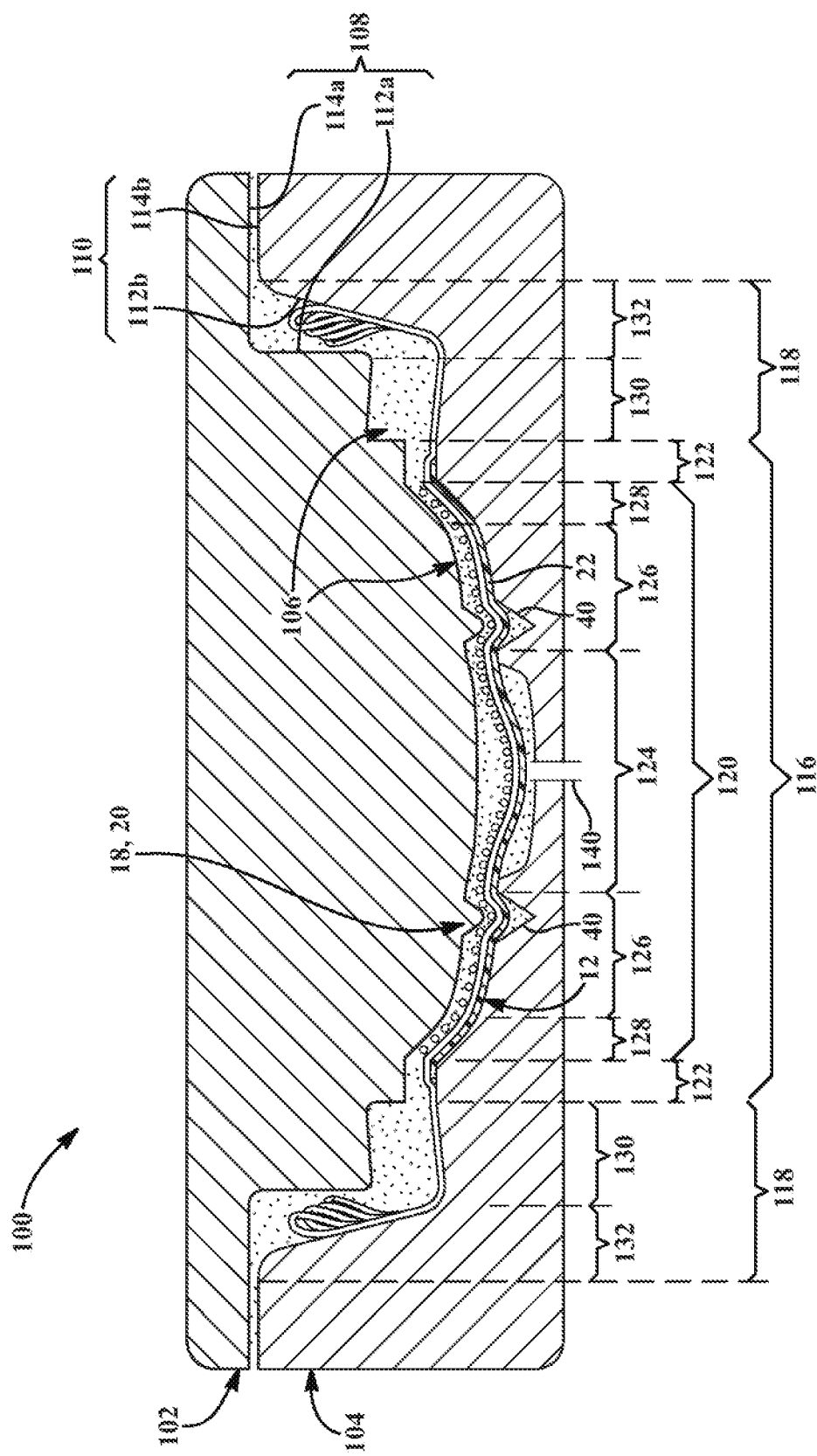
FIG. 4C is a cross-sectional view of the mold system of FIG. 1, showing the mold system in the closed position with liquid material being injected into the mold cavity.

Referring now to FIG. 4C, once the mold 100 is in the closed position, the liquid material 16 is injected into the mold cavity 106 through one or more injection ports 140 formed in the upper and/or lower mold plates 102, 104. Here, a single port 140 is shown in the central channel region 124 of the mold cavity 106. However, in other examples, a plurality of ports 140 may be distributed along the mold cavity 106. Initially, liquid material 16 is injected into the plate-forming region 120, such that the material 16 is infused within or encapsulates the portions of the strands 20 disposed within the plate-forming region 120. In these implementations, the liquid material 16 may include a curable material provided to the mold cavity 106 in a fluid state and having a viscosity ranging from 25 cps to 2500 cps. The curable material can include a polymerizable composition, or a crosslinkable composition, or both. When cured, the curable material forms a solid polymeric material having a surface hardness ranging from 60 Shore A to 100 Shore D. The curable material can include one or more pre-polymers or polymers. The curable material can be a thermosettable material which, when cured, forms a solid thermoset material. The curable material may include at least one of an epoxy and a polyurethane. Moreover, one or more additional polymers, such as a rubber and/or a block copolymer, may be added to the curable material to increase its ductility when cured. The liquid material 16 can be a thermoplastic material provided to the mold cavity 106 in a molten state, which, when cooled to a temperature below its melting point, forms a solid thermoplastic material. The thermoplastic material may include at least one of a thermoplastic polyurethane, a thermoplastic polyester, a thermoplastic polyether, and a thermoplastic polyamide. Additionally or alternatively, a polymeric material (e.g., fibers or filaments comprising a thermoplastic material, or fibers or filaments comprising a second polymeric material which is soluble in the liquid material) may be incorporated into the at least one strand 20 and/or a substrate to assist with consolidating the at least one strand 20, and, when a substrate is present, with binding/affixing the at least one strand 20 to the substrate 22.

As the liquid material 16 flows into or within the mold cavity 106, the liquid material 16 fills the plate-forming region 120 to define the footbed 32 of the plate 10, which includes the traction elements 40 formed by the projection elements 134 and the shank 44 formed by the channel region 124. As discussed previously, the preform 12 is only partially pushed into the lower projection feature 134b by the upper projection feature 134a such that a gap is formed between the preform 12 and the lower tip of the lower projection feature 134b. When the liquid material 16 flows into the mold cavity 106, the tip of the lower projection features 134b is filled with the liquid material 16. Accordingly, the traction elements 40 formed with the projection elements 134 include distal ends or tips that are entirely formed of the liquid material 16, while the material of the preform 12 is disposed in an intermediate portion of the traction elements 40. Furthermore, the upper projection features 134a form concave depressions 42 in a top side of the footbed 32. Thus, the rounded upper projection features 134a function to force at least some of the fibers associated with the preform 12 into each of the lower projection features 134b, allowing enough of the liquid material 16 within the projection element 134 to prevent damage to the fibers while simultaneously minimizing areas of excess liquid material thickness by forming the depressions 42 on opposite sides from the traction elements 40.

After the plate-forming region 120 is filled, excess liquid material 16 will flow through the trim region 122 and into the relief region 118. Here, the liquid material may be provided until the relief region 118 is filled to a desired level, or until a desired threshold mold pressure is satisfied. For example, the relief region 118 may only be partially filled with the liquid material, such that the loops 30 within the relief region 118 are partially encapsulated by the liquid material 16, and are partially encapsulated by the solid polymeric material once the liquid material has solidified. Thus, in addition to the footbed 32 of the plate 10 that is formed in the plate-forming region 120, the liquid material 16 and the peripheral portion of the preform 12 may cooperate to form a trim flange 34 and flashing 36 corresponding to the trim region 122 and the relief region 118, respectively.

With reference to FIG. 5B, the trim flange 34 surrounds the footbed 32 of the plate 10, and provides a continuous rim around the molded plate 10 that can be removed to form the outer periphery 38 of the finished plate 10. As discussed above, the trim region 122 of the mold cavity 106 has a width $W_{122}$ of at least 3 mm. Accordingly, the trim flange 34 will also have a width of at least 3 mm, which provides sufficient width for allowing a cutting tool to be maneuvered along the trim flange 34 in a post-molding trim step. By providing a trim flange 34 having a width greater than the width of the cutting tool, the flashing 36 (i.e., excess preform 12 and material 16) can be easily removed from the plate 10 to provide the plate 10 with a smooth outer peripheral edge 38. The inclusion of the trim flange 34 is particularly useful when using CNC cutting equipment, as the trim flange 34 is configured to provide a boundary region along which the CNC cutting equipment can be programmed to follow. In some examples, the trim flange 34 is formed as a substantially flat or planar region. However, in other examples, where the outer peripheral edge 38 of the finished plate 10 is contoured (i.e., not in the same horizontal plane), the trim flange 34 may also be contoured to correspond to the outer peripheral edge 38. In some implementations, the trim flange 34 will extend outwardly from the peripheral edge at a constant angle corresponding to the angle α discussed above with respect to the mold surfaces 108, 110.

When the mold cavity 106 is sufficiently filled with the liquid material 16, the material 16 is cured within the mold cavity 106 under the effects of heat and pressure to form a plate blank or composite preform 13 including the preform 12 and the cured material 16. In a cured state, the material 16 is hardened or solidified such that the composite preform 13 is rigid. For example, the portion of the composite preform 13 forming the footbed 32 may have a density ranging from 0.85 g/cm$^3$ to 1.35 g/cm$^3$ and a stiffness ranging from 0.5 GPa to 5.0 GPa. The composite preform 13 may be described as an intermediate state of the finished plate 10, where the trim flange 34 and the flashing 36 have not been removed from the footbed 32. Once the material 16 is cured, the mold 100 is moved to an opened position by translating the upper mold portion 102 away from the lower mold portion 104. With the mold 100 opened, the composite preform 13 is exposed and can be removed from the mold cavity 106 for finishing.

With reference to FIG. 5C, in the finishing steps, the trim flange 34 and the flashing 36 are removed from the footbed 32 of the composite preform 13 to define the outer periphery 38 of the plate 10. Here, the loops 30 are trimmed from the ends 28 of the strand segments 26 such the ends 28 terminate at the outer periphery 38 of the plate 10. Accordingly, the ends 28 of the strand segments 26 may be exposed along the outer periphery 38 of the plate 10. The plate 10 can then be incorporated into an article of footwear 1000 and, more particularly, within a midsole 1004 of a sole structure 1002 of an article of footwear 1000.

The following Clauses provide an exemplary configuration of a mold and a method of forming a composite article described above.

Clause 1: A mold for forming a composite article, the mold comprising: a first mold plate having a first mold surface defining a first side of a mold cavity; and a second mold plate having a second mold surface opposing the first mold surface of the first mold plate and defining a second side of the mold cavity, the mold cavity including (i) an article-forming region configured to impart a profile of the composite article, (ii) a trim region surrounding the article-forming region, and (iii) a relief region surrounding the trim region.

Clause 2: The mold of Clause 1, wherein the mold cavity has a first thickness in the article-forming region, a second thickness in the trim region, and a third thickness in the relief region.

Clause 3: The mold of Clause 2, wherein the first thickness and the second thickness are the same.

Clause 4: The mold of Clause 2, wherein the third thickness is greater than the first thickness and the second thickness.

Clause 5: The mold of Clause 4, wherein the first thickness includes a variable thickness dependent upon a population density of a strand to be formed in the mold.

Clause 6: The mold of any of the preceding Clauses, wherein the article-forming region of the mold cavity includes a channel region, a support region surrounding the channel region, and a peripheral lip region extending from an outer periphery of the support region.

Clause 7: The mold of any of the preceding Clauses, wherein the relief region of the mold cavity defines a peripheral void surrounding the trim region.

Clause 8: The mold of any of the preceding Clauses, wherein at least one of the first mold plate and the second mold plate includes an injection port in fluid communication with the mold cavity.

Clause 9: The mold of any of the preceding Clauses, wherein the relief region includes a lateral portion and a vertical portion.

Clause 10: The mold of Clause 9, wherein the lateral portion is adjacent to and surrounds the trim region and the vertical portion is adjacent to and surrounds the lateral portion.

Clause 11: The mold of Clause 9, wherein the lateral portion includes a first thickness and the vertical portion includes a second thickness that is greater than the first thickness.

Clause 12: The mold of any of the preceding Clauses, wherein the mold is a mold for forming a composite article of footwear, apparel, or sporting equipment.

Clause 13: The mold of Clause 12, wherein the mold is a mold for forming a composite plate for an article of footwear, and the article-forming region is a plate-forming region configured to impart a profile of the composite plate.

Clause 14: The mold of any of the preceding Clauses, wherein a width of the trim region is at least 3 mm.

Clause 15: The mold of any of the preceding Clauses, wherein the first mold surface includes a plurality of first projection features and the second mold surface includes a plurality of second projection features each configured to receive a corresponding one of the first projection features, the first projection features having a height that is less than a depth of the second projection features.

Clause 16: The mold of Clause 15, wherein the first projection features are rounded and the second projection features are pointed.

Clause 17: A method of forming a composite article, the method comprising: inserting a preform into a mold cavity of a mold, wherein the preform has an interior portion and a peripheral portion surrounding the interior portion, wherein the inserting includes receiving the interior portion of the preform in a molding region of the mold cavity and receiving the peripheral portion of the preform in a relief region of the mold cavity; following the inserting, closing the mold; in the closed mold, compressing the interior portion of the preform within the molding region; and during the compressing, maintaining the peripheral portion loose within the relief region.

Clause 18: A method of forming a composite article, the method comprising: constructing a preform including an interior portion and a peripheral portion surrounding the interior portion, the strand layer including a plurality of strand segments traversing the interior portion and defining a first strand segment population density in a first area of the interior portion and a second strand segment population density in a second area of the interior portion; inserting the preform into a molding region of a mold cavity of a mold, inserting the preform includes inserting the first area of the interior portion in a first portion of molding region having a first thickness corresponding to the first strand segment population density and inserting the second area of the interior portion in a second portion of the molding region having a second thickness corresponding to the second strand segment population density; following the inserting, closing the mold; in the closed mold, compressing the interior portion of the preform within the molding region; and during the compressing, maintaining the peripheral portion loose within the relief region.

Clause 19: The method of Clause 17 or 18, wherein the preform comprises a strand layer attached to a substrate.

Clause 20: The method of Clause 19, wherein the substrate comprises a polymeric material.

Clause 21: The method of Clause 20, wherein the polymeric material is a thermoplastic material.

Clause 22: The method of Clause 20 or 21, wherein the substrate is a woven textile, a knit textile, an injection molded polymeric material, an extruded polymeric material, or a thermoformed polymeric material.

Clause 23: The method of any of Clauses 19-22 wherein the strand layer is attached to the substrate by stitches of a stitching thread.

Clause 24: The method of any of Clauses 19-23, wherein the preform includes the strand layer arranged as a plurality of strand segments traversing the interior portion of the preform.

Clause 25: The method of Clause 24, wherein the strand layer includes strands positioned on the substrate to form a plurality of segments traversing the interior portion.

Clause 26: The method of Clause 25, wherein the preform further comprises one or more loops of the strand disposed within the peripheral portion of the preform.

Clause 27: The method of Clause 26, further comprising positioning the plurality of the loops within the relief region of the mold cavity.

Clause 28: The method of any of Clauses 18-27, wherein the strand layer includes at least one of carbon fibers, boron fibers, glass fibers, and polymeric fibers.

Clause 29: The method of Clause 28, wherein the strand layer includes first fibers and second fibers, the second fibers having at least one of a different length, thickness, melting temperature, and Young's modulus than the first fibers, optionally wherein the first fibers and the second fibers are comingled.

Clause 30: The method of Clause 29, wherein at least one of a stitching thread, the substrate, the first fibers, and the second fibers comprise a thermoplastic material.

Clause 31: The method of any of Clauses 18-30, further comprising providing a liquid material to the preform, and infusing at least the strand layer of the preform with the liquid material.

Clause 32: The method of Clause 17, further comprising providing a liquid material to at least the interior portion of the preform, and infusing at least the interior portion of the preform with the liquid material.

Clause 33: The method of Clause 31 or 32, wherein providing the liquid material includes providing a thermosettable material in a fluid state.

Clause 34: The method of Clause 31 or 32, wherein providing the liquid material includes providing at least one of an epoxy, a polyurethane, or both.

Clause 35: The method of any of Clauses 31-34, wherein providing the liquid material includes providing a thermoplastic material.

Clause 36: The method of any of Clauses 31-35, wherein providing the liquid material comprises injecting the liquid material into the molding region of the mold cavity in the closed mold.

Clause 37: The method of any of Clauses 31-36, wherein the method further comprises inserting a component comprising a thermoplastic material into the mold cavity prior to closing the mold, and providing the liquid material comprises, before or after closing the mold, increasing a temperature of the component to a temperature at or above a melting temperature of the thermoplastic material.

Clause 38: The method of any of Clauses 31-36, wherein the method further comprises attaching the strand layer to a substrate comprising a thermoplastic material, and providing the liquid material comprises, before or after closing the mold, increasing a temperature of the substrate to a temperature at or above a melting temperature of the thermoplastic material.

Clause 39: The method of any of Clauses 31-38, further comprising: in the closed mold, curing the liquid material to a solid polymeric material to form a rigid composite preform including the preform infused with the solid polymeric material; after the material is cured, opening the mold; and after the mold is opened, removing the composite preform from the mold cavity.

Clause 40: The method of Clause 17-39, further comprising forming the interior portion of the composite preform into a footbed and a trim flange.

Clause 41: The method of Clause 40, further comprising removing the trim flange from the composite preform.

Clause 42: The method of Clause 40 or 41, further comprising forming the footbed and the trim flange with the same thickness.

Clause 43: The method of any one of Clauses 17-42, further comprising removing the peripheral portion of the preform.

Clause 44: The composite article of any of Clauses 17-43, wherein the composite article is a component of an article of footwear, apparel or sporting equipment.

Clause 45: The composite article of Clause 44, wherein the composite article is a plate for a sole structure of an article of footwear.

Clause 46: A composite article formed by: inserting a preform into a mold cavity of a mold, wherein (i) the preform has an interior portion and a peripheral portion surrounding the interior portion and (ii) the inserting includes receiving the interior portion of the preform in a molding region of the mold cavity and receiving the peripheral portion of the preform in a relief region of the mold cavity; following the inserting, closing the mold; in the closed mold, compressing the interior portion of the preform within the molding region; during the compressing, maintaining the peripheral portion loose within the relief region; during the compressing, providing a liquid material to the molding region of the mold cavity; and solidifying the liquid material into a solid polymeric material, to form a composite preform including the preform and the solid polymeric material.

Clause 47: The composite article of Clause 46, wherein the preform includes a strand layer attached to a substrate.

Clause 48: The composite article of Clause 47, wherein the strand layer includes a plurality of strand segments disposed in the interior portion of the preform, and a plurality of loops connecting the plurality of strand segments in the peripheral portion.

Clause 49: The composite article of any of Clauses 46-48, wherein the interior portion includes a footbed and a trim flange, and the peripheral portion includes flashing.

Clause 50: The composite article of Clause 49, wherein the trim flange and the flashing are removed from the footbed.

Clause 51: The composite article of Clause 50, wherein the footbed includes an exposed peripheral edge.

Clause 52: The composite article of Clause 51, wherein the strand segments are trimmed along the exposed peripheral edge.

Clause 53: The composite article of Clause 52, wherein the peripheral edge is smooth and continuous.

Clause 54: The composite article of Clause 52 or 53, wherein the peripheral edge is free from the loops.

Clause 55: An article of footwear including the composite article of any of Clauses 44-54.

Clause 56: A sole structure for an article of footwear including the composite article of any of Clauses 42-52.

Clause 57: A composite preform comprising: a strand layer including one or more strands forming a plurality of strand segments traversing an interior portion of the composite preform and one or more loops disposed in a peripheral portion of the preform and connecting the plurality of strand segments; and a solid polymeric material infused within the strand layer.

Clause 58: The composite preform of Clause 57, wherein the interior portion of the composite preform includes a footbed and a trim flange, and the peripheral portion of the composite preform includes flashing.

Clause 59: The composite preform of Clause 58, wherein the footbed is contoured and the trim flange extends outwardly from the footbed at a constant angle.

Clause 60: The composite preform of any of Clauses 57-59, wherein the loops are partially encapsulated by the solid polymeric material.

Clause 61: The composite preform of any of Clauses 57-60, further comprising a substrate.

Clause 62: The composite preform of any of Clauses 57-61, wherein the strand layer is attached to the substrate.

Clause 63: A composite article comprising: a strand layer including one or more strands forming a plurality of strand segments; and a solid polymeric material infused within the strand layer.

Clause 64: The composite article of Clause 63, wherein the composite article includes a continuous peripheral edge.

Clause 65: The composite article of Clause 64, wherein the plurality of the strand segments are trimmed along the continuous peripheral edge.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The invention claimed is:

1. A method of forming a composite article, the method comprising:
   inserting a preform into a mold cavity of a mold, the preform having a strand layer including an interior portion and a peripheral portion surrounding the interior portion, wherein the inserting includes inserting the interior portion of the preform into a molding region of the mold cavity and inserting the peripheral portion of the preform into a relief region of the mold cavity;
   closing the mold following insertion of the preform into the mold cavity;
   compressing the interior portion of the preform within the molding region in the closed mold;
   maintaining the peripheral portion loose within the relief region during compression of the interior portion;
   after the maintaining step, providing a liquid material to the preform and infusing at least the strand layer of the preform including the interior portion and the peripheral portion with the liquid material;
   curing the liquid material to a solid polymeric material in the closed mold to form a rigid composite preform including the preform infused with the solid polymeric material, the compressed interior portion of the preform being formed into a footbed and a trim flange;
   opening the mold after the liquid material is cured; and
   removing the cured composite preform from the opened mold cavity.

2. The method of claim 1, wherein providing the liquid material comprises injecting the liquid material into the molding region of the mold cavity in the closed mold.

3. The method of claim 1, wherein (i) the method further comprises inserting a component comprising a thermoplastic material into the mold cavity prior to closing the mold and (ii) providing the liquid material comprises, before or after closing the mold, increasing a temperature of the component to a temperature at or above a melting temperature of the thermoplastic material.

4. The method of claim 1, further comprising removing the peripheral portion of the composite preform.

5. The method of claim 1, further comprising forming the footbed and the trim flange with the same thickness.

6. The method of claim 1, further comprising biasing the preform partially into a recess of the mold cavity.

7. The method of claim 1, wherein the preform comprises the strand layer attached to a substrate.

8. A method of forming a composite article, the method comprising:
   constructing a preform having a strand layer including an interior portion and a peripheral portion surrounding the interior portion, the strand layer including a plurality of strand segments traversing the interior portion and defining a first strand segment population density in a first area of the interior portion and a second strand segment population density in a second area of the interior portion;

inserting the preform into a molding region of a mold cavity of a mold including inserting the first area of the interior portion in a first portion of the molding region having a first thickness corresponding to the first strand segment population density and inserting the second area of the interior portion in a second portion of the molding region having a second thickness corresponding to the second strand segment population density;

closing the mold following insertion of the preform into the molding region;

compressing the interior portion of the preform within the molding region in the closed mold;

after the compressing step, providing a liquid material to the preform and infusing at least the strand layer of the preform including the interior portion and peripheral portion with the liquid material;

curing the liquid material to a solid polymeric material in the closed mold to form a rigid composite preform including the preform infused with the solid polymeric material, the compressed interior portion of the preform being formed into a footbed and a trim flange;

opening the mold after the liquid material is cured; and removing the cured composite preform from the opened mold cavity.

9. The method of claim 8, wherein providing the liquid material comprises injecting the liquid material into the molding region of the mold cavity in the closed mold.

10. The method of claim 8, wherein (i) the method further comprises attaching the strand layer to a substrate comprising a thermoplastic material and (ii) providing the liquid material comprises, before or after closing the mold, increasing a temperature of the substrate to a temperature at or above a melting temperature of the thermoplastic material.

11. The method of claim 8, further comprising forming the footbed and the trim flange with the same thickness.

12. The method of claim 8, further comprising removing the peripheral portion of the preform.

13. The method of claim 8, further comprising biasing the preform partially into a recess of the mold cavity to form a traction element including the preform.

14. The method of claim 8, wherein inserting the preform into the mold cavity includes inserting a peripheral portion of the preform in a relief region of the mold cavity.

* * * * *